United States Patent
Shibata et al.

(10) Patent No.: US 11,555,995 B2
(45) Date of Patent: Jan. 17, 2023

(54) MICROSCOPE SYSTEM, CONTROL METHOD, AND RECORDING MEDIUM

(71) Applicant: Evident Corporation, Nagano (JP)

(72) Inventors: Motohiro Shibata, Tokyo (JP); Takehiko Hayashi, Tokyo (JP); Keita Kojima, Tokyo (JP); Keigo Mori, Tokyo (JP)

(73) Assignee: Evident Corporation, Nagano (JP)

( * ) Notice: Subject to any disclaimer, the term of this patent is extended or adjusted under 35 U.S.C. 154(b) by 38 days.

(21) Appl. No.: 17/324,173

(22) Filed: May 19, 2021

(65) Prior Publication Data
US 2021/0364774 A1 Nov. 25, 2021

(30) Foreign Application Priority Data
May 20, 2020 (JP) .............................. JP2020-088466

(51) Int. Cl.
G02B 21/36 (2006.01)
G02B 21/34 (2006.01)
(Continued)

(52) U.S. Cl.
CPC ......... *G02B 21/365* (2013.01); *G02B 21/025* (2013.01); *G02B 21/34* (2013.01);
(Continued)

(58) Field of Classification Search
CPC .... G02B 21/365; G02B 21/025; G02B 21/34; G06V 20/693; G01N 21/6458; G01N 2021/6439
(Continued)

(56) References Cited

U.S. PATENT DOCUMENTS 10,429,631 B2  10/2019 Mori
2003/0179445 A1  9/2003 Maenle et al.
(Continued)

FOREIGN PATENT DOCUMENTS

JP  2000088764 A  3/2000
JP  2007233098 A  9/2007
(Continued)

OTHER PUBLICATIONS

U.S. Appl. No. 17/324,235, First Named Inventor: Keita Kojima; Title: "Microscope System, Control Method, and Recording Medium"; filed May 19, 2021.
(Continued)

*Primary Examiner* — Allen C Wong
(74) *Attorney, Agent, or Firm* — Holtz, Holtz & Volek PC

(57) ABSTRACT

A microscope system is provided with a microscope that acquires images at least at a first magnification and a second magnification higher than the first magnification, and a processor. The processor is configured to specify a type of a container in which a specimen is placed, and when starting observation of the specimen placed in the container at the second magnification, the processor is configured to specify an observation start position by performing object detection according to the type of container on a first image that includes the container acquired by the microscope at the first magnification, and control a relative position of the microscope with respect to the specimen such that the observation start position is contained in a field of view at the second magnification of the microscope.

20 Claims, 24 Drawing Sheets

(51) Int. Cl.
 *G02B 21/02* (2006.01)
 *G06V 20/69* (2022.01)
 *G01N 21/64* (2006.01)

(52) U.S. Cl.
 CPC ....... *G06V 20/693* (2022.01); *G01N 21/6458* (2013.01); *G01N 2021/6439* (2013.01)

(58) Field of Classification Search
 USPC .......................................................... 348/79
 See application file for complete search history.

(56) References Cited

U.S. PATENT DOCUMENTS

| | | |
|---|---|---|
| 2007/0206096 A1 | 9/2007 | Cooke et al. |
| 2007/0206097 A1 | 9/2007 | Uchiyama et al. |
| 2010/0309306 A1 | 12/2010 | Uchiyama et al. |
| 2012/0044342 A1 | 2/2012 | Hing et al. |
| 2014/0313312 A1 | 10/2014 | Gaiduk et al. |
| 2015/0057167 A1 | 2/2015 | Kaiser et al. |
| 2017/0330327 A1 | 11/2017 | Ippolito et al. |
| 2019/0228840 A1 | 7/2019 | Kamens et al. |
| 2020/0023360 A1 | 1/2020 | Cunningham et al. |
| 2020/0124837 A1* | 4/2020 | Putman .............. G02B 21/0032 |
| 2020/0160522 A1* | 5/2020 | Merlo ................... G06T 7/0014 |
| 2021/0018742 A1 | 1/2021 | Stumpe |
| 2021/0090238 A1 | 3/2021 | Gallagher-Gruber et al. |
| 2022/0005574 A1 | 1/2022 | Kühn |
| 2022/0178958 A1 | 6/2022 | Mizutani et al. |

FOREIGN PATENT DOCUMENTS

| | | |
|---|---|---|
| JP | 4917329 B2 | 2/2012 |
| JP | 4917331 B2 | 2/2012 |
| JP | 6374197 B2 | 7/2018 |

OTHER PUBLICATIONS

Office Action (Non-Final) dated Jul. 14, 2022, issued in related U.S. Appl. No. 17/324,235.

* cited by examiner

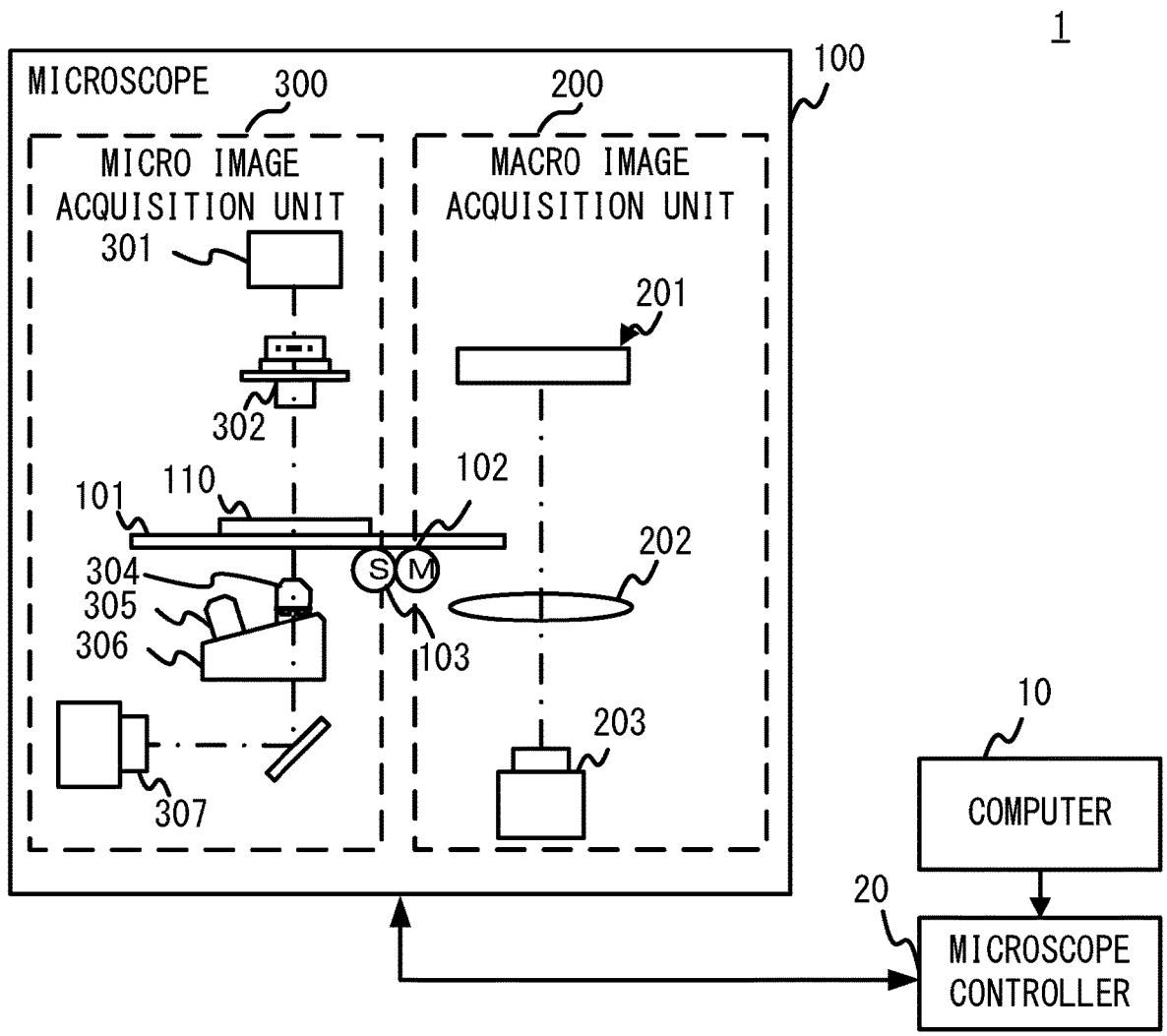
F I G. 1

| TYPE OF CONTAINER | MICROSCOPE SLIDE | DISH | MULTI-WELL PLATE | OTHER |
|---|---|---|---|---|
| ACCELERATION [m/s^2] | 800 | 400 | 300 | 300 |
| INITIAL SPEED [m/s] | 10 | 5 | 1 | 1 |
| MAXIMUM SPEED [m/s] | 40 | 20 | 10 | 5 |

T1

PS1   PS2   PS3   PS4

F I G. 5

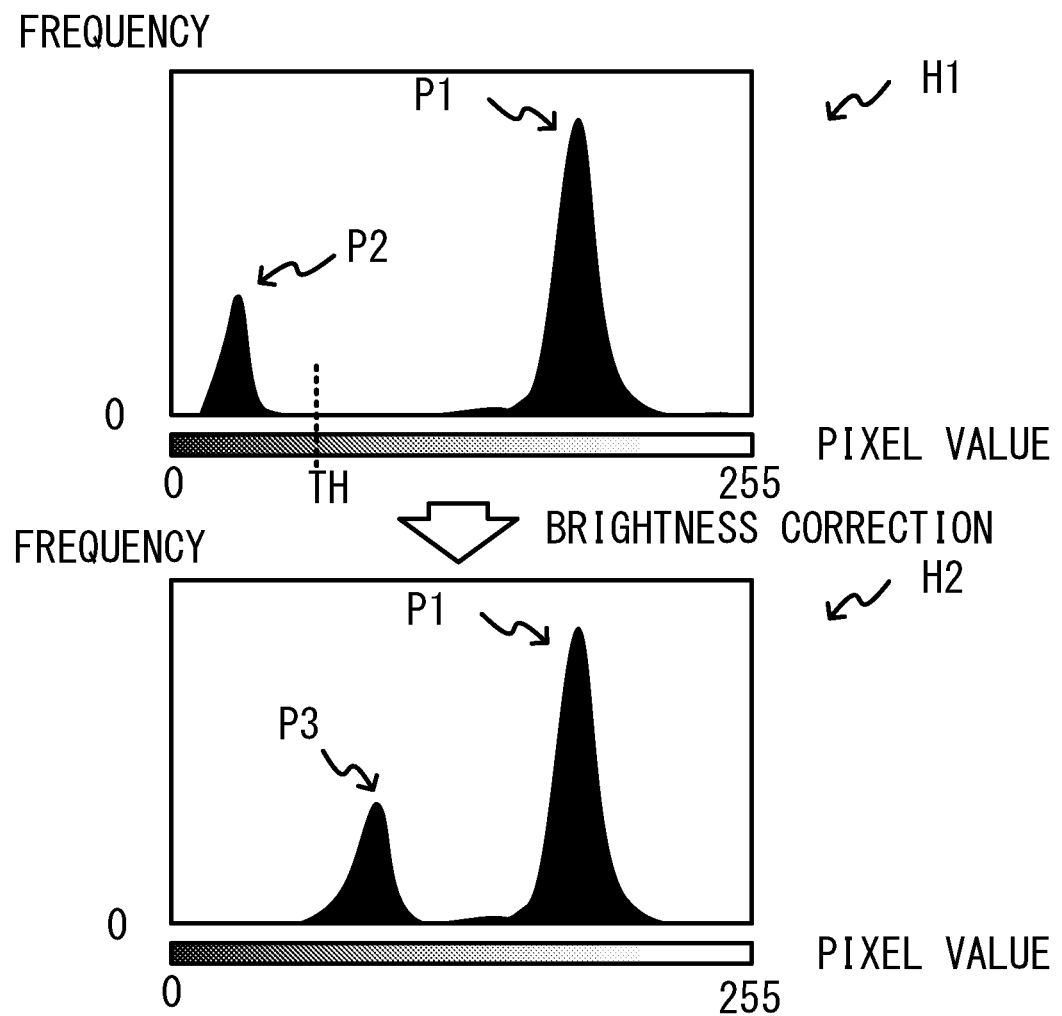
F I G. 9

| TYPE OF CONTAINER | MICROSCOPE SLIDE | DISH | MULTI-WELL PLATE | OTHER |
|---|---|---|---|---|
| ACCELERATION[m/s^2] | 800 | 400 | 300 | 300 |
| INITIAL SPEED[m/s] | 10 | 5 | 1 | 1 |
| MAXIMUM SPEED[m/s] | 40 | 20 | 10 | 5 |

I1

PS1  PS2  PS3  PS4

| TYPE OF CONTAINER | MICROSCOPE SLIDE |
|---|---|
| SIZE | - |
| ACCELERATION[m/s^2] | 800 |
| INITIAL SPEED[m/s] | 10 |
| MAXIMUM SPEED[m/s] | 40 |

I2

PS5

| TYPE OF CONTAINER | DISH | | | |
|---|---|---|---|---|
| SIZE | 35mm | 60mm | 100mm | 150mm |
| ACCELERATION[m/s^2] | 400 | 350 | 300 | 250 |
| INITIAL SPEED[m/s] | 5 | 5 | 5 | 3 |
| MAXIMUM SPEED[m/s] | 20 | 20 | 15 | 15 |

I3

PS6  PS7  PS8  PS9

| TYPE OF CONTAINER | MULTI-WELL PLATE | | | | |
|---|---|---|---|---|---|
| SIZE | 6well | 12well | 24well | 48well | 96well |
| ACCELERATION[m/s^2] | 200 | 220 | 250 | 280 | 300 |
| INITIAL SPEED[m/s] | 1 | 1 | 1 | 1 | 1 |
| MAXIMUM SPEED[m/s] | 5 | 5 | 10 | 10 | 10 |

I4

PS10  PS11  PS12  PS13  PS14

| TYPE OF CONTAINER | OTHER |
|---|---|
| SIZE | - |
| ACCELERATION[m/s^2] | 300 |
| INITIAL SPEED[m/s] | 1 |
| MAXIMUM SPEED[m/s] | 5 |

I5

PS15

F I G. 1 3

T1

| TYPE OF CONTAINER | MICROSCOPE SLIDE | DISH | MULTI-WELL PLATE | OTHER |
|---|---|---|---|---|
| ACCELERATION [m/s^2] | 800 | 400 | 300 | 300 |
| INITIAL SPEED [m/s] | 10 | 5 | 1 | 1 |
| MAXIMUM SPEED [m/s] | 40 | 20 | 10 | 5 |

PS1　PS2　PS3　PS4

T6

| TYPE OF SPECIMEN | FLOATING SPECIMEN IN FLUID | ADHESIVE SPECIMEN IN FLUID | SPECIMEN NOT IN FLUID |
|---|---|---|---|
| ACCELERATION [m/s^2] | 50 | 400 | 800 |
| INITIAL SPEED [m/s] | 1 | 5 | 10 |
| MAXIMUM SPEED [m/s] | 5 | 20 | 40 |

PS16　PS17　PS18

F I G. 1 4

T7

| STAINING STATE OF SPECIMEN | STAINED | UNSTAINED | SPECIMEN NOT DETECTED |
|---|---|---|---|
| OBSERVATION METHOD | BRIGHT FIELD | PHASE CONTRAST | PHASE CONTRAST |

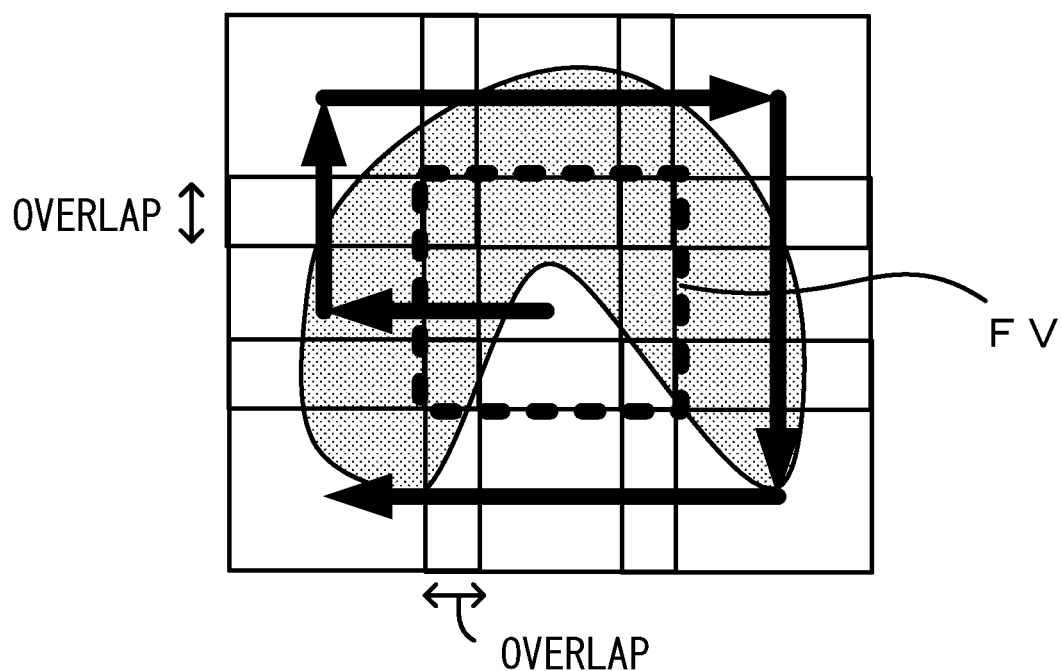
F I G. 1 8

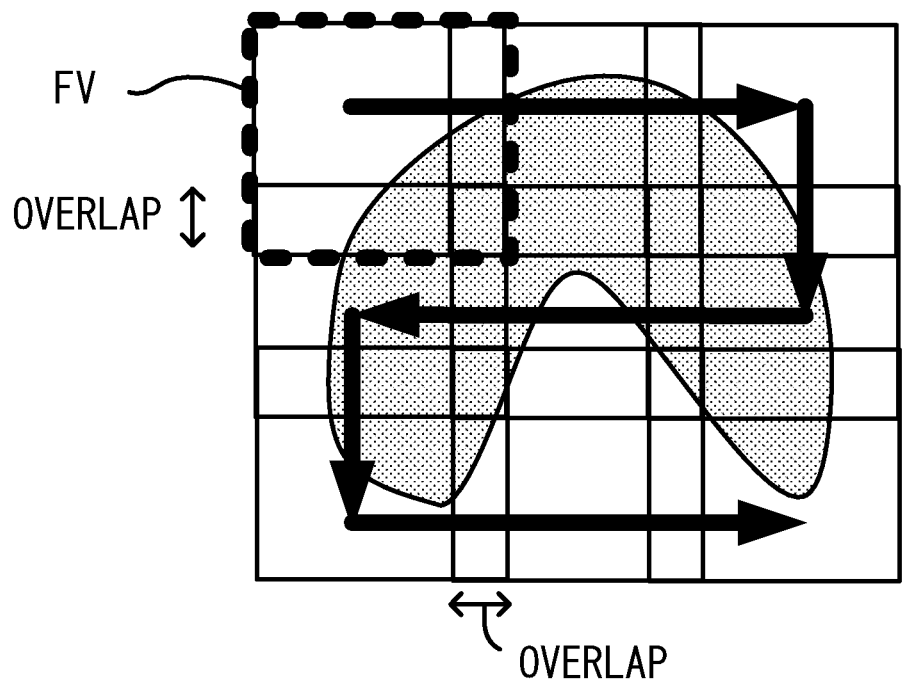
F I G. 1 9

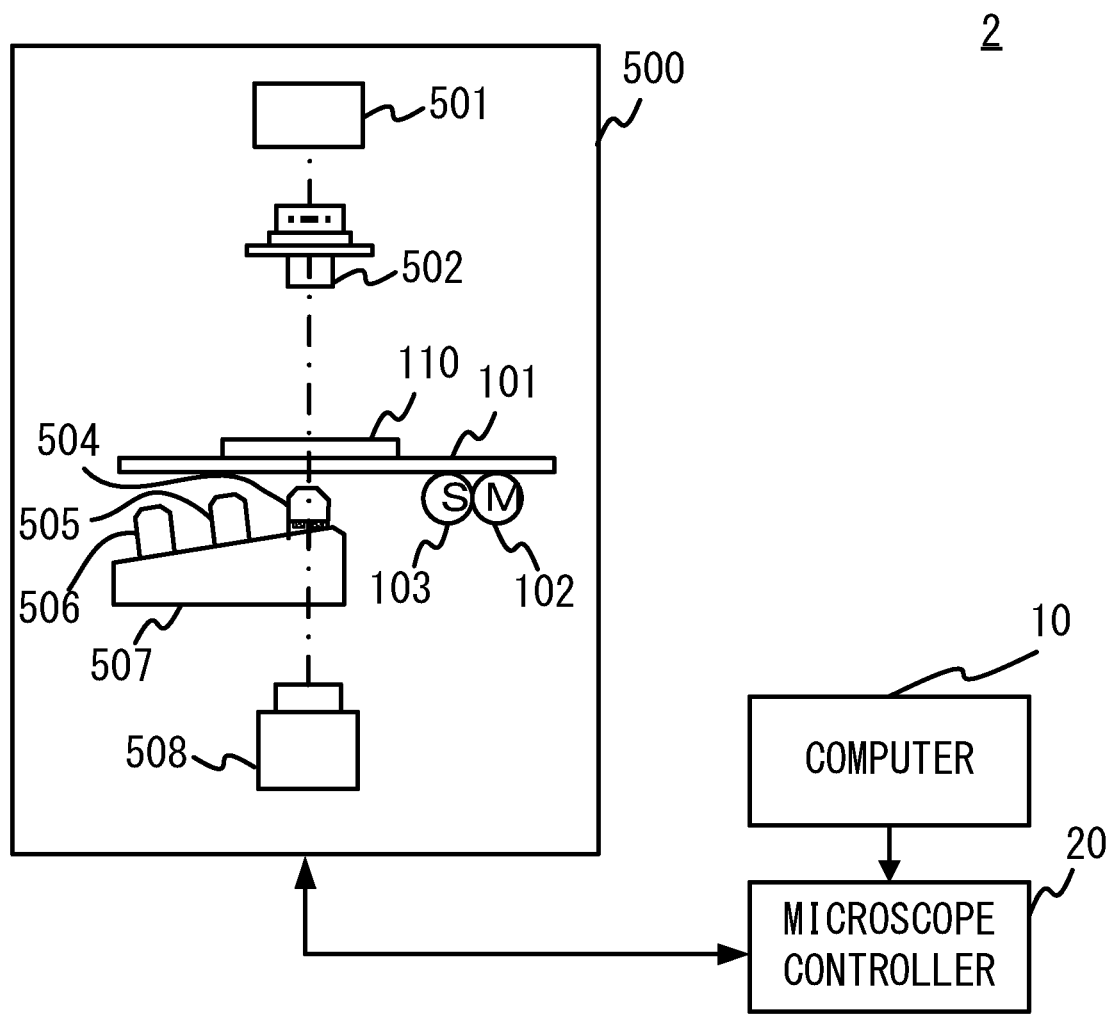
F I G. 24

US 11,555,995 B2

MICROSCOPE SYSTEM, CONTROL METHOD, AND RECORDING MEDIUM

CROSS REFERENCE TO RELATED APPLICATIONS

This application is based upon and claims the benefit of priority from prior Japanese Patent Applications No. 2020-088466, filed May 20, 2020, the entire contents of which are incorporated herein by this reference.

BACKGROUND OF THE INVENTION

Field of the Invention

The disclosure of this specification relates to a microscope system, a control method, and a recording medium.

Description of the Related Art

By using a microscope system, a user is able to observe an enlarged image of a subject. On the other hand, as the subject is enlarged further, the field of view of the microscope system becomes narrower, making it difficult to keep the observation target area of the subject contained inside the field of view. Additionally, the depth of focus also becomes shallower as higher resolving power is demanded, making it difficult to align the focal point of the microscope system with the observation target area. Consequently, in order to elicit high performance from the microscope system, various adjustments and settings are necessary before starting close observation, and the time and labor that this work involves is a significant burden on the user.

Technology related to such a technical problem is described in Japanese Patent Laid-Open No. 2007-233098, for example. Japanese Patent Laid-Open No. 2007-233098 describes a technology that acquires a macro image of a subject, and refers to the acquired macro image to set properties such as an image acquisition range containing a specimen as the imaging conditions of a micro image. In other words, a technology that automatically sets the imaging conditions of the micro image by detecting the specimen from the macro image is described.

SUMMARY OF THE INVENTION

A microscope system according to one aspect of the present invention is provided with a microscope that acquires images at least at a first magnification and a second magnification higher than the first magnification, and a processor. The processor is configured to specify a type of a container in which a specimen is placed, and when starting observation of the specimen placed in the container at the second magnification, the processor is configured to specify an observation start position according to the specified type of the container by performing object detection according to the type of container on a first image that includes the container acquired by the microscope at the first magnification, and control a relative position of the microscope with respect to the specimen such that the observation start position is contained in a field of view at the second magnification of the microscope.

A control method according to another aspect of the present invention is a control method, executed by a computer, of a microscope system provided with a microscope that acquires images at least at a first magnification and a second magnification higher than the first magnification, the control method including: specifying a type of a container in which a specimen is placed; and when starting observation of the specimen placed in the container at the second magnification, specifying an observation start position according to the specified type of the container by performing object detection according to the type of container on a first image that includes the container acquired by the microscope at the first magnification; and controlling a relative position of the microscope with respect to the specimen such that the observation start position is contained in a field of view at the second magnification of the microscope.

A recording medium according to another aspect of the present invention is a non-transitory recording medium storing a program, the program causing a computer of a microscope system provided with a microscope that acquires images at least at a first magnification and a second magnification higher than the first magnification to execute a process including: specifying a type of a container in which a specimen is placed; and when starting observation of the specimen placed in the container at the second magnification, specifying an observation start position according to the specified type of the container by performing object detection according to the type of container on a first image that includes the container acquired by the microscope at the first magnification; and controlling a relative position of the microscope with respect to the specimen such that the observation start position is contained in a field of view at the second magnification of the microscope.

BRIEF DESCRIPTION OF THE DRAWINGS

The present invention will be more apparent from the following detailed description when the accompanying drawings are referenced.

FIG. 1 is a diagram illustrating an example of the configuration of a microscope system 1;

FIG. 5 is a diagram illustrating an example of a table for selecting the parameters of the motorized stage 101;

FIG. 9 is a diagram illustrating an example of histograms before and after brightness correction;

FIG. 13 is a diagram illustrating another example of a table for selecting the parameters of the motorized stage 101;

FIG. 14 is a diagram illustrating yet another example of a table for selecting the parameters of the motorized stage 101;

FIG. 15 is a diagram illustrating an example of a table for selecting an observation method for micro observation;

FIG. 18 is a diagram for explaining an example of a scanning method that scans a map region;

FIG. 19 is a diagram for explaining another example of a scanning method that scans a map region;

FIG. 24 is a diagram illustrating an example of the configuration of a microscope system 2.

DETAILED DESCRIPTION OF THE PREFERRED EMBODIMENTS

With macro observation, a specimen is not necessarily detected successfully. The observation magnification and resolving power of macro observation are lower than the observation magnification and resolving power of micro observation, and therefore small specimens such as cells for example may not be detected in some cases. With the technology described in Japanese Patent Laid-Open No. 2007-233098, the user is forced to perform laborious adjustments and settings in cases where a specimen is not detected.

Hereinafter, an embodiment of the present invention will be described in consideration of circumstances like the above.

Figure 2:
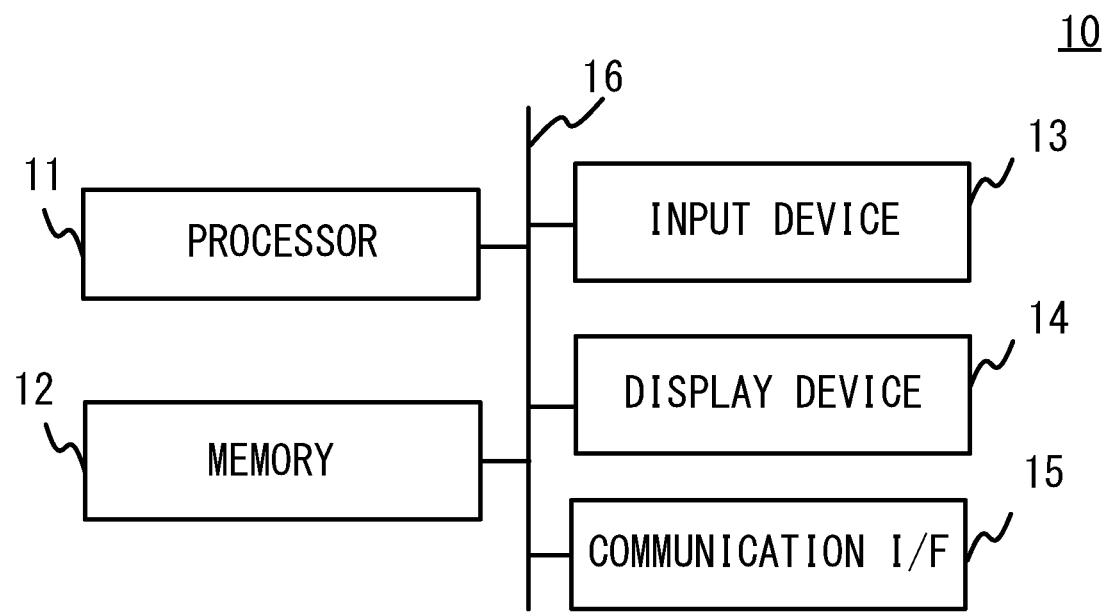
FIG. 2 is a diagram illustrating an example of the configuration of a computer 10.

FIG. 1 is a diagram illustrating an example of the configuration of a microscope system 1. FIG. 2 is a diagram illustrating an example of the configuration of a computer 10 included in the microscope system 1. The microscope system 1 is capable of automating at least part of the work of making various adjustments and settings (hereinafter referred to as observation preparation work) that needs to be performed by the user him- or herself before starting observation in microscope systems of the related art, and thereby enable specimen observation with high-quality microscope images while also reducing the workload on the user. Hereinafter, the configuration of the microscope system 1 will be described with reference to FIGS. 1 and 2.

As illustrated in FIG. 1, the microscope system 1 is provided with a microscope 100, a computer 10 that controls the microscope system 1 overall, and a microscope controller 20 that controls the microscope 100. The microscope 100 is communicably connected to the microscope controller 20, and in addition, the computer 10 and the microscope controller 20 are communicably connected to each other.

The microscope 100 is provided with a macro image acquisition unit 200 that acquires an image at a relatively low observation magnification (first magnification) and a micro image acquisition unit 300 that acquires an image at a relatively high observation magnification (second magnification). In other words, the microscope 100 is an example of an image acquisition unit that acquires images at least at a first magnification and a second magnification. Additionally, the microscope 100 is provided with a motorized stage 101 on which a container holder retaining unit 110 is provided. Note that in the following, the image acquired by the macro image acquisition unit 200 is referred to as the macro image or the first image, and the image acquired by the micro image acquisition unit 300 is referred to as the micro image or second image where necessary.

The motorized stage 101 includes a motor 102 and an origin sensor 103. The rotation of the motor 102 causes the motorized stage 101 to move in a direction (XY direction) orthogonal to the optical axis of both the macro image acquisition unit 200 and the micro image acquisition unit 300. The motorized stage 101 is controlled by the microscope controller 20. More specifically, the microscope controller 20 controls the motor 102 by using an origin in the XY direction detected by the origin sensor 103 as a reference, thereby causing the motorized stage 101 to transport a subject placed in the container holder retaining unit 110 on the optical axis of the macro image acquisition unit 200 or the optical axis of the micro image acquisition unit 300. Here, the subject simply means an object to be imaged, and is distinct from a specimen, which is a target object that the user mainly observes. Note that the specimen may be included in the subject. Furthermore, the microscope controller 20 can control the motor 102 to cause the motorized stage 101 to align any position on the subject with the center of the field of view of the macro image acquisition unit 200 or the center of the field of view of the micro image acquisition unit 300. Note that the microscope controller 20 outputs position information about the motorized stage 101 to the computer 10 at appropriate timings or on request.

The macro image acquisition unit 200 is provided with a macro light source 201, a macro optical system 202, and an imaging device 203. In addition, the macro image acquisition unit 200 may also be provided with an illuminating optical system that irradiates the subject with illuminating light emitted from the macro light source 201. The macro light source 201 is a lamp light source such as a xenon lamp, or a light-emitting diode (LED), for example. The observation magnification (first magnification) of the macro optical system 202 is sufficiently any magnification at which at least a specimen container described later is contained in the field of view of the macro optical system 202, and more desirably is a magnification at which a container holder held by the container holder retaining unit 110 is contained in one or two macro images. The imaging device 203 is a device such as a charge-coupled device (CCD) image sensor or a complementary MOS (CMOS) image sensor.

In the macro image acquisition unit 200, by having the macro optical system 202 condense light passing through the subject onto the imaging device 203, the imaging device 203 picks up the subject and acquires a macro image of the subject. Additionally, the imaging device 203 outputs image data of the subject to the computer 10 through the microscope controller 20. Note that the amount of illuminating light emitted from the macro light source 201 or radiated toward the subject is controlled by the microscope controller 20. Also, operations such as the imaging operations performed by the imaging device 203 are controlled by the microscope controller 20. For example, the microscope controller 20 may control the imaging device 203 according to inputs from the computer 10 to switch automatic gain control on/off, set gain settings, switch automatic exposure control on/off, set exposure times, set the degree of edge enhancement, set gamma correction, and the like.

The micro image acquisition unit 300 is provided with a micro light source 301, a condenser 302, a plurality of objective lenses (objective lens 304, objective lens 305) attached to a revolving nosepiece 306, and an imaging device 307. The micro image acquisition unit 300 is capable of acquiring images by multiple observation methods, and in this example, can acquire images by a bright-field observation method and a phase contrast observation method. The condenser 302 supports multiple observation methods, and when acquiring images by the phase contrast observation method for example, a ring slit is disposed inside the condenser 302, as illustrated in FIG. 1. Note that the ring slit is removably disposed, and when acquiring images by the bright-field observation method for example, the condenser 302 is used in a state with the ring slit moved outside the optical path. Note that the micro image acquisition unit 300 may also be provided with a plurality of condensers corresponding to the observation methods. Also, the objective lens 304 is a phase contrast objective lens used in the phase contrast observation method, and includes a phase film at a position corresponding to the ring slit. The objective lens 305 is an objective lens used in the bright-field observation method. The revolving nosepiece 306 is a switching mechanism for switching the objective lens disposed on the optical axis. Additionally, the revolving nosepiece 306 also functions as a focusing device that moves the objective lens in the optical axis direction by moving along the optical axis. The imaging device 307 is a device such as a charge-coupled device (CCD) image sensor or a complementary MOS (CMOS) image sensor.

In the micro image acquisition unit 300, illuminating light emitted from the micro light source 301 irradiates the subject through the condenser. Thereafter, by condensing light passing through the subject onto the imaging device 307 through the objective lens and a tube lens not illustrated, the imaging device 307 picks up the subject and acquires a micro image of the subject. Additionally, the imaging device 307 outputs image data of the subject to the computer 10 through the microscope controller 20. Note that the amount of illuminating light emitted from the micro light source 301 or radiated toward the subject is controlled by the microscope controller 20. Also, operations such as the imaging operations performed by the imaging device 307 are controlled by the microscope controller 20. For example, the microscope controller 20 may control the imaging device 307 according to inputs from the computer 10 to switch automatic gain control on/off, set gain settings, switch automatic exposure control on/off, set exposure times, set the degree of edge enhancement, set gamma correction, and the like.

The revolving nosepiece 306 includes a motor and an origin sensor not illustrated. The rotation of the motor causes the revolving nosepiece 306 to move in the optical axis direction (Z direction) of the micro image acquisition unit 300. The revolving nosepiece 306 is controlled by the microscope controller 20. More specifically, by having the microscope controller 20 control the motor by using an origin in the Z direction detected by the origin sensor as a reference, the objective lens can be moved in the optical axis direction of the micro image acquisition unit 300 to adjust the focus. In this case, the revolving nosepiece 306 functions as a focusing device. Note that the microscope controller 20 outputs position information about the revolving nosepiece 306 to the computer 10 at appropriate timings or on request. In this instance, an example of the revolving nosepiece 306 functioning as a focusing device is illustrated, but the motorized stage 101 may also move in the optical axis direction instead of the revolving nosepiece 306.

The microscope controller 20 is a controller that controls the microscope 100, and controls the motorized devices included in the microscope 100 as a whole (except the imaging device 203 and the imaging device 307) under control by the computer 10. Specifically, for example, the microscope controller 20 performs processes such as a process of controlling the motorized stage 101 to change the observation position, a process of controlling the revolving nosepiece 306 to change the focus, a process of switching the objective lens and the condenser to change the observation magnification or the observation method, a process of controlling the light source (macro light source 201, micro light source 301) to perform exposure, and a process of controlling the imaging operations performed by the imaging device 203 and the imaging device 307. In addition, the microscope controller 20 also performs a process of notifying the computer 10 of the state of the microscope 100.

The computer 10 is an example of a control unit that controls the microscope system 1 overall, and controls the microscope 100 and the microscope controller 20. For example, as illustrated in FIG. 2, the computer 10 is provided with a processor 11, memory 12, an input device 13, a display device 14, and a communication I/F 15, which are interconnected by a bus 16. Note that FIG. 2 is an example of the configuration of the computer 10, and the computer 10 is not limited to this configuration. The computer 10 may be achieved by a general-purpose computer such as a workstation or a personal computer, or by a special-purpose computer.

The processor 11 includes one or more processors. The one or more processors may include a central processing unit (CPU), a graphics processing unit (GPU), and a digital signal processor (DSP), for example. Additionally, an application-specific integrated circuit (ASIC), a field-programmable gate array (FPGA), or the like may also be included. The processor 11 may execute a predetermined software program for example to perform the processes described later and illustrated in FIG. 4.

The memory 12 includes a non-transitory computer readable medium storing the software program executed by the processor 11. The memory 12 may include one or a plurality of semiconductor memory of any type, and may also include one or a plurality of other storage devices, for example. The semiconductor memory includes volatile memory such as random access memory (RAM) and non-volatile memory such as read-only memory (ROM), programmable ROM, and flash memory, for example. The RAM may include dynamic random access memory (DRAM) or static random access memory (SRAM), for example. The other storage devices may include a magnetic storage device including a magnetic disk for example, or an optical storage device including an optical disc for example.

The input device 13 is a device that detects operations by the user of the microscope system 1 and inputs operation information. The input device 13 includes a keyboard, a mouse, a handle, a joystick, and various switches, for example. The display device 14 is an example of a display unit that displays a screen on the basis of a display signal from the processor 11. For example, the display device 14 is a liquid crystal display device, an organic electro-luminescence (OLE) display device, or a cathode ray tube (CRT) display device. The display device 14 may also be provided with a touch panel sensor, and in this case also functions as the input device 13. The communication I/F 15 transmits and receives signals to and from the microscope 100 and the microscope controller 20.

Note that although FIG. 1 illustrates an example in which the microscope 100 included in the microscope system 1 is an inverted microscope, the microscope 100 is not limited to an inverted microscope and may also be an upright microscope. Also, although FIG. 1 illustrates an example in which the microscope 100 adopts a trans-illumination method, the microscope 100 may also adopt an epi-illumination method. Also, although an example is illustrated in which the microscope 100 switches between the bright-field observation method and the phase contrast observation method by using dedicated objective lenses, the microscope 100 may also switch between the bright-field observation method and the phase contrast observation method without switching the objective lens to another objective lens by inserting or removing a phase modulation element (phase film) with respect to the pupil position. Also, although an example is illustrated in which the microscope 100 supports the bright-field observation method and the phase contrast observation method, the microscope 100 may also support other observation methods, such as a fluorescence observation method, a differential interference contrast observation method, an oblique observation method, or a dark-field observation method, for example.

Also, although an example is illustrated in which the macro image acquisition unit 200 and the micro image acquisition unit 300 each include an imaging device, the macro image acquisition unit 200 and the micro image acquisition unit 300 may also share an imaging device by being adjusted such that the respective image positions are positioned in the same plane. Also, although an example in which the micro image acquisition unit 300 includes two objective lenses is illustrated, three or more objective lenses may also be included, and objective lenses corresponding to multiple different observation magnifications may also be included. Likewise, two or more condensers may also be included.

Also, an example is illustrated in which the computer 10, the microscope controller 20, and the microscope 100 are configured as respectively separate devices in the microscope system 1, but some or all of these devices may also be integrated. For example, the microscope 100 and the microscope controller 20 may be integrated, or the microscope 100, the computer 10, and the microscope controller 20 may be integrated.

Also, although an example in which the computer 10 includes the input device 13 and the display device 14 is illustrated, the input device 13 and the display device 14 may also be devices separate from the computer 10. The computer 10 may also be communicably connected to the input device 13 and the display device 14 which are independent from the computer 10.

Figure 3:
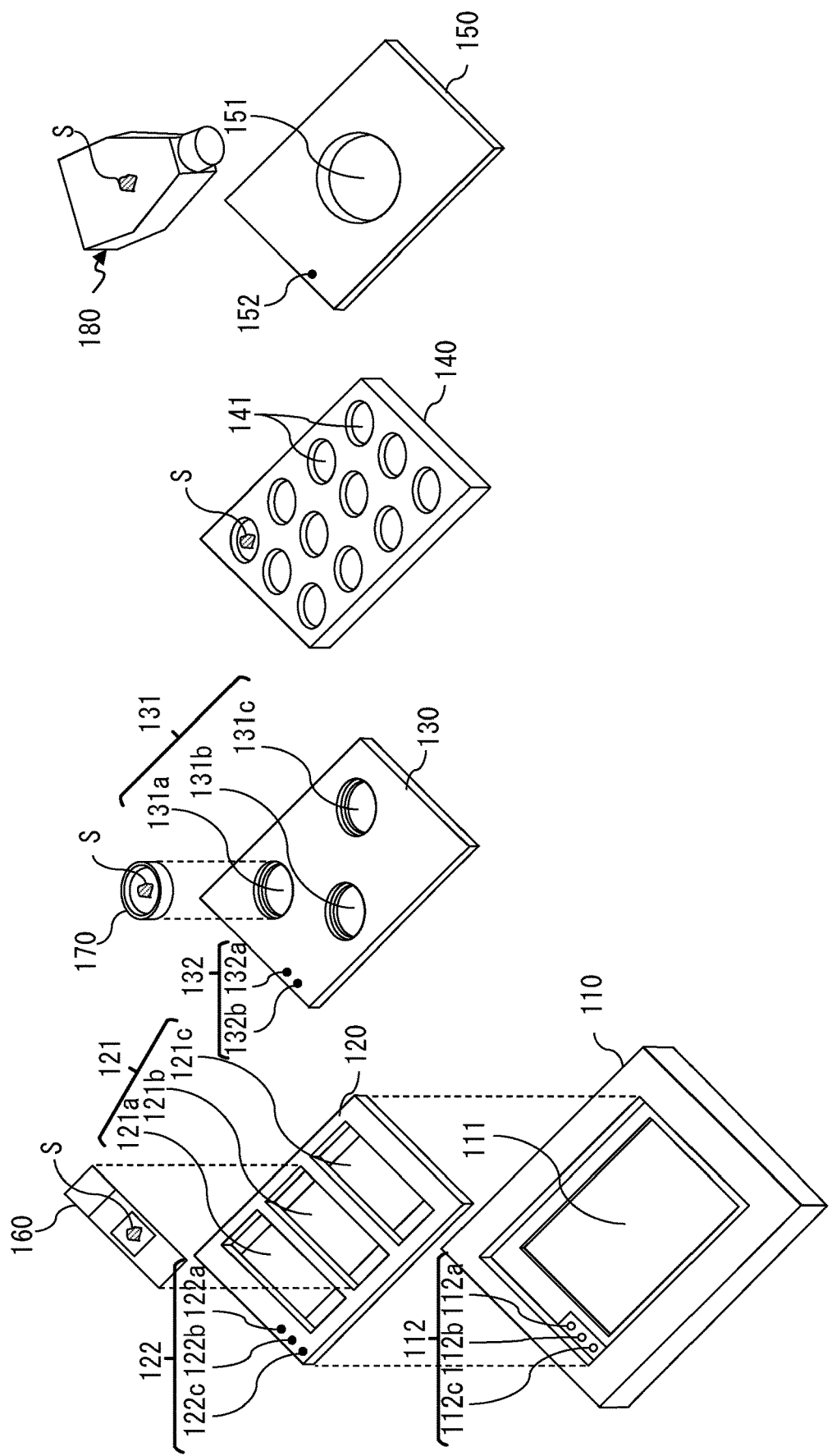
FIG. 3 is a diagram for describing a method of acquiring identification information that identifies a specimen container.

FIG. 3 is a diagram for describing a method of acquiring identification information that identifies a specimen container. The microscope system 1 has a function of acquiring identification information that identifies a specimen container, and specifying the type of specimen container on the basis of the acquired identification information. Hereinafter, a method of acquiring identification information will be described with reference to FIG. 3.

As illustrated in FIG. 3, an opening 111 is formed in the container holder retaining unit 110 provided on the motorized stage 101. By placing a container holder that holds specimen containers so as to cover the opening 111, a user is able to use the microscope system 1 to observe specimens contained in various specimen containers. In addition, the container holder retaining unit 110 is provided with a plurality of Hall-effect sensors 112 (Hall-effect sensor 112a, Hall-effect sensor 112b, Hall-effect sensor 112c) that act as non-contact magnetic sensors at predetermined positions.

In the case of observing a specimen S affixed to a microscope slide 160, it is sufficient to place a microscope slide holder 120, which is a type of container holder, in the container holder retaining unit 110. The microscope slide holder 120 can hold up to a maximum of three microscope slides at the same time by fitting microscope slides into openings 121 (opening 121a, opening 121b, opening 121c) formed in the microscope slide holder 120. Note that three magnets 122 are affixed to the microscope slide holder 120. More specifically, when the microscope slide holder 120 is placed in the container holder retaining unit 110, a magnet 122a is affixed to a position facing the Hall-effect sensor 112a, the magnet 122b is affixed to a position facing the Hall-effect sensor 112b, and the magnet 122c is affixed to a position facing the Hall-effect sensor 112c. Consequently, when the microscope slide holder 120 is placed in the container holder retaining unit 110, all three of the Hall-effect sensors 112 detect the magnets.

Also, in the case of observing a specimen S contained in a dish 170, it is sufficient to place a dish holder 130, which is a type of container holder, in the container holder retaining unit 110. The dish holder 130 can hold up to a maximum of three dishes at the same time by fitting dishes into openings 131 (opening 131a, opening 131b, opening 131c) formed in the dish holder 130. Note that two magnets 132 are affixed to the dish holder 130. More specifically, when the dish holder 130 is placed in the container holder retaining unit 110, a magnet 132a is affixed to a position facing the Hall-effect sensor 112a and a magnet 132b is affixed to a position facing the Hall-effect sensor 112b. Consequently, when the dish holder 130 is placed in the container holder retaining unit 110, two of the Hall-effect sensors 112 detect the magnets.

Also, in the case of observing a specimen S contained in a well 141 of a multi-well plate 140 (also called microplate), it is sufficient to place the multi-well plate 140 itself in the container holder retaining unit 110. Note that no magnets are affixed to the multi-well plate 140. Consequently, when the multi-well plate 140 is placed in the container holder retaining unit 110, none of the three Hall-effect sensors detects a magnet.

Also, in the case of observing a specimen S contained in a flask 180, it is sufficient to place a general-purpose container holder 150, which is a type of container holder, in the container holder retaining unit 110. An opening 151 is formed in the general-purpose container holder 150, and therefore a specimen S can be observed by placing the flask 180 in the general-purpose container holder 150 so that the specimen S is positioned over the opening 151. Note that one magnet 152 is affixed to the general-purpose container holder 150. More specifically, when the general-purpose container holder 150 is placed in the container holder retaining unit 110, the magnet 152 is affixed to a position facing the Hall-effect sensor 112a. Consequently, when the general-purpose container holder 150 is placed in the container holder retaining unit 110, one of the Hall-effect sensors 112 (the Hall-effect sensor 112a) detects the magnet. Note that a specimen container other than the flask 180 may also be placed in the general-purpose container holder 150.

In this way, in the microscope system 1, the number of magnets detected by the Hall-effect sensors 112 varies according to the type of container holder (microscope slide holder 120, dish holder 130, general-purpose container holder 150) or the type of specimen container (multi-well plate 140) placed in the container holder retaining unit 110.

For this reason, by acquiring information related to the number of magnets detected by the Hall-effect sensors 112 through the microscope controller 20, the computer 10 can specify the type of specimen container placed in the motorized stage 101 on the basis of the acquired information. In other words, in the microscope system 1, the computer 10 acquires information related to the number of detected magnets as identification information that identifies the type of specimen container into which a specimen has been placed, and specifies the type of specimen container in which a specimen has been placed on the basis of the acquired identification information.

Note that it is sufficient for the microscope system 1 to be provided with a detection unit that directly or indirectly outputs identification information to the computer 10, and it is sufficient for the detection unit to detect an identification structure corresponding to the type of specimen container, the identification structure being provided in the container holder that holds the specimen container or in the specimen container itself. FIG. 3 illustrates an example in which the magnets provided in the container holder or in the specimen container itself function as the identification structure and the Hall-effect sensors function as the detection unit that detects the identification structure, but as another example, different numbers of openings may be formed for each type of container holder at the positions where the magnets had been affixed, and an optical sensor that detects light incident through these openings may be provided in the container holder retaining unit 110. In this case, the openings provided in the container holder or the specimen container itself function as the identification structure, and the optical sensor functions as the detection unit that detects the identification structure.

Additionally, FIG. 3 illustrates an example of providing the detection unit in the container holder retaining unit 110, but the detection unit may be placed at any position insofar as the identification structure is detectable. For example, the detection unit may be provided in the motorized stage 101 or in some other location in the microscope 100 rather than in the container holder retaining unit 110. Note that the number of containers that the container holder holds is not limited to the example in FIG. 3. For example, a microscope slide holder into which four or more slides can be fitted may also be held in the container holder retaining unit 110, and a dish holder into which four or more dishes can be fitted may also be held in the container holder retaining unit 110. Additionally, multi-well plates having various numbers of wells (such as 6, 12, 24, 48, and 96, for example) may be held in the container holder retaining unit 110.

By automating at least a portion of the observation preparation work that needs to be performed by the user him- or herself before starting observation in microscope systems of the related art, the microscope system 1 configured as above enables the user to start the observation of a specimen without having to perform laborious work. More specifically, the microscope system 1 automates the specimen search that imposes an especially heavy workload among the observation preparation work, for example. With this arrangement, the user burden can be reduced significantly, while in addition, the observation of a specimen can be started easily and quickly, even for a light user who does not have expertise in microscopes. Furthermore, the microscope system 1 automatically determines and proposes to the user a range (map region) over which to construct a map image, for example. In the case of observing a specimen closely at a high observation magnification, the field of view is narrowed, and therefore a map image that enables the user to grasp the relationship between the overall image of the specimen and the current observation position is extremely beneficial. By proposing a range over which to construct a map image, the microscope system 1 can save the user the time and effort of searching for and setting the range over which to construct a map image. With this arrangement, the user burden can be reduced significantly, while in addition, the close observation of a specimen can be started easily and quickly, even for a light user who does not have expertise in microscopes.

Figure 4:
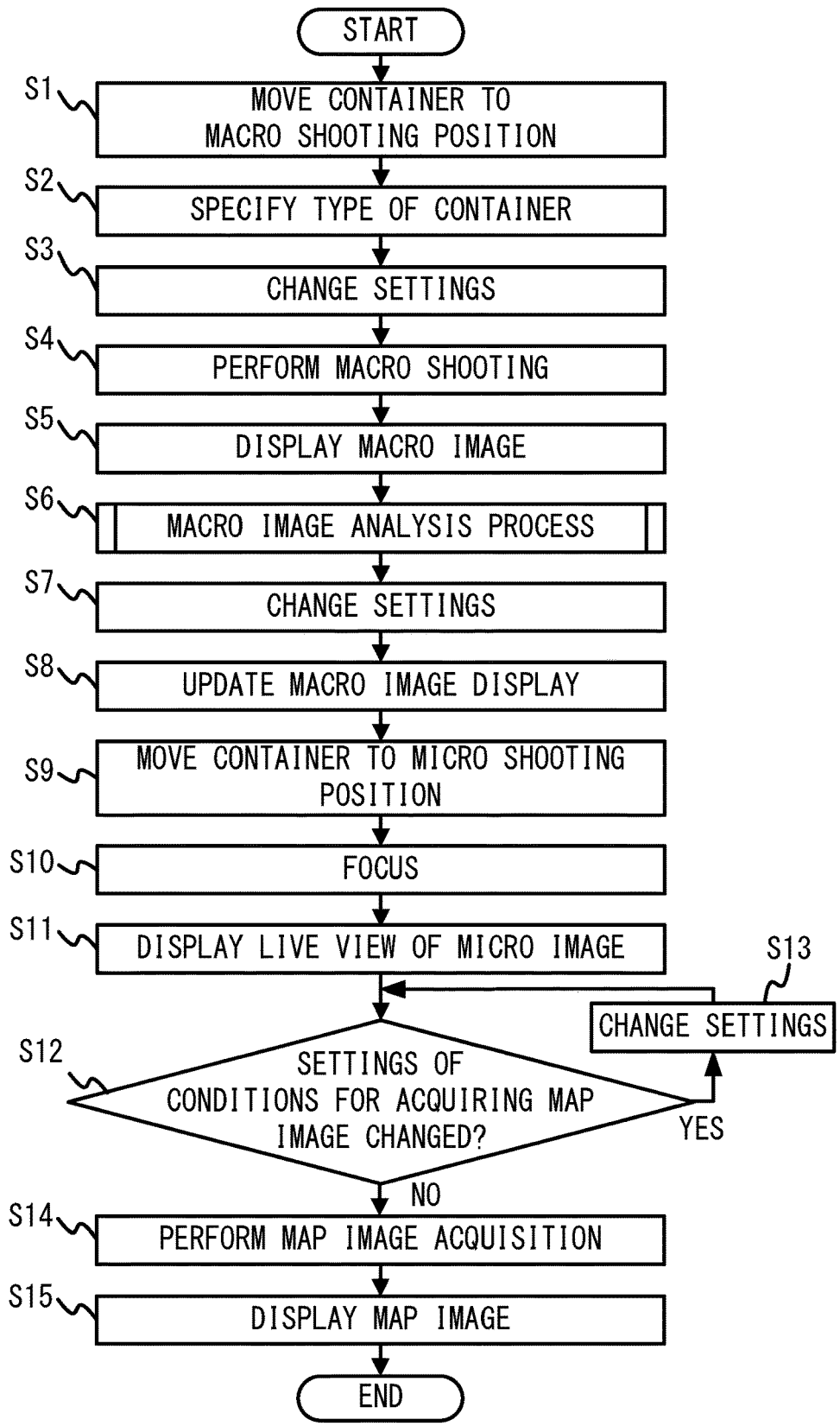
FIG. 4 is a diagram illustrating an example of a flowchart of an observation preparation process performed by the microscope system 1.

FIG. 4 is a diagram illustrating an example of a flowchart of an observation preparation process performed by the microscope system 1. Hereinafter, an observation preparation process in which at least a portion of the observation preparation work is automated will be described with reference to FIG. 4. The observation preparation process is started when the user uses the input device 13 to instruct the microscope system 1 to start observation after placing a specimen container in the container holder retaining unit 110, for example. Note that the observation preparation process illustrated in FIG. 4 is one example of a control method of the microscope system 1 performed by the computer 10, and is performed by having the processor 11 execute a program stored in the memory 12, for example.

When the observation preparation process starts, first, the microscope system 1 moves the specimen container placed in the container holder retaining unit 110 to a macro shooting position (step S1). Here, the computer 10 controls the microscope controller 20 to cause the microscope controller 20 to move the motorized stage 101 such that the container holder retaining unit 110 is positioned on the optical axis of the macro image acquisition unit 200. At this time, the microscope controller 20 controls the movement of the motorized stage 101 according to initial settings regardless of the type of specimen container.

When the specimen container is moved to the macro shooting position, the microscope system 1 specifies the type of specimen container (step S2). Here, the Hall-effect sensors 112 provided in the container holder retaining unit 110 detect the number of magnets corresponding to the container holder to thereby output identification information that identifies the type of specimen container, and the computer 10 specifies the type of specimen container on the basis of the inputted identification information. Specifically, in the case where the identification information indicates that there are three magnets, the computer 10 specifies microscope slide as the type of specimen container. Also, in the case where the identification information indicates that there are two magnets, the computer 10 specifies dish as the type of specimen container. Also, in the case where the identification information indicates that there is one magnet, the computer 10 specifies another specimen container such as a flask as the type of specimen container. Also, in the case where the identification information indicates that there are zero magnets, the computer 10 specifies multi-well plate as the type of specimen container.

When the type of specimen container is specified, the microscope system 1 changes the settings of the microscope system 1 to settings in accordance with the specified type of specimen container (step S3). Here, the computer 10 reads out a parameter set corresponding to the type of specimen container specified in step S2 from a table T1 illustrated in FIG. 5 that is pre-stored in the memory 12 and sets the parameter set in the microscope system 1.

FIG. 5 is a diagram illustrating an example of a table for selecting the parameters of the motorized stage 101. In the table T1 illustrated in FIG. 5, parameter sets (parameter set PS1 to parameter set PS4) related to the driving of the motorized stage 101 that is desired for each type of specimen container are stored. The parameter sets related to the driving of the motorized stage 101 include parameters such as the acceleration, initial speed, and maximum speed of the motorized stage 101, for example. A comparison of the parameter sets stored in the table T1 reveals that the parameter sets for specimen containers other than microscope slides (parameter set PS2 to parameter set PS4) have values that move the motorized stage 101 more slowly and gradually than the parameter set PS1 for microscope slides. This is because in specimen containers other than microscope slides, there is a high probability that the specimen is contained in a state of being immersed in a liquid, and if the motorized stage 101 is moved quickly or suddenly, the specimen and the liquid in which the specimen is immersed may shake violently in association with the movement of the motorized stage 101, and there is a possibility of adversely affecting the quality of the image. Note that although an example of the parameter sets being stored in a table is illustrated, the method of storing the parameter sets is not particularly limited to the above example. The parameter sets may be stored in any format insofar as a parameter set is specifiable in accordance with the type of specimen container.

In step S3, by setting a parameter set in accordance with the specimen container, in the case where a microscope slide having a specimen that is secured and resistant to shaking is placed on the motorized stage 101, the motorized stage 101 moves quickly and the time required for image acquisition is reduced. Also, in the case where a specimen container other than a microscope slide is placed on the motorized stage 101, the motorized stage 101 moves relatively slowly so as not to influence the image quality. In this way, by controlling the driving of the motorized stage 101 according to the specimen container, it is possible to acquire images in as short a time as possible while also avoiding a drop in image quality.

When the settings are changed in step S3, the microscope system 1 performs macro shooting (step S4). Here, by having the computer 10 control the microscope 100 and the microscope controller 20, the macro image acquisition unit 200 acquires an image of the subject at a first magnification. More specifically, first, the macro image acquisition unit 200 acquires an image of the upper half of the container holder retained by the container holder retaining unit 110. Next, the microscope controller 20 moves the motorized stage 101 such that the lower half of the container holder is in the field of view of the macro image acquisition unit 200. At this time, the motorized stage 101 operates according to the parameters set in step S3. Thereafter, the macro image acquisition unit 200 acquires an image of the lower half of the container holder retained by the container holder retaining unit 110. Finally, the macro image acquisition unit 200 outputs two macro images showing the entire container holder to the computer 10.

Note that in macro shooting, the entire container holder may also be acquired in a single image. Although it is desirable for the macro images acquired in step S4 to show most of the container holder, it is not strictly necessary to show the entire container holder. It is sufficient for the macro images to show at least the specimen container. In other words, the macro images are images that contain the specimen container. Also, various correction processes may be performed by the computer 10 as necessary on the macro images acquired by macro shooting. For example, the computer 10 may perform correction processes such as shading correction, distortion correction, and magnification chromatic aberration correction on the macro images.

When macro shooting ends, the microscope system 1 displays the macro images (step S5). Here, the computer 10 displays a screen 400 illustrated in FIG. 6 that includes the macro images acquired in step S4 on the display device 14.

Figure 6:
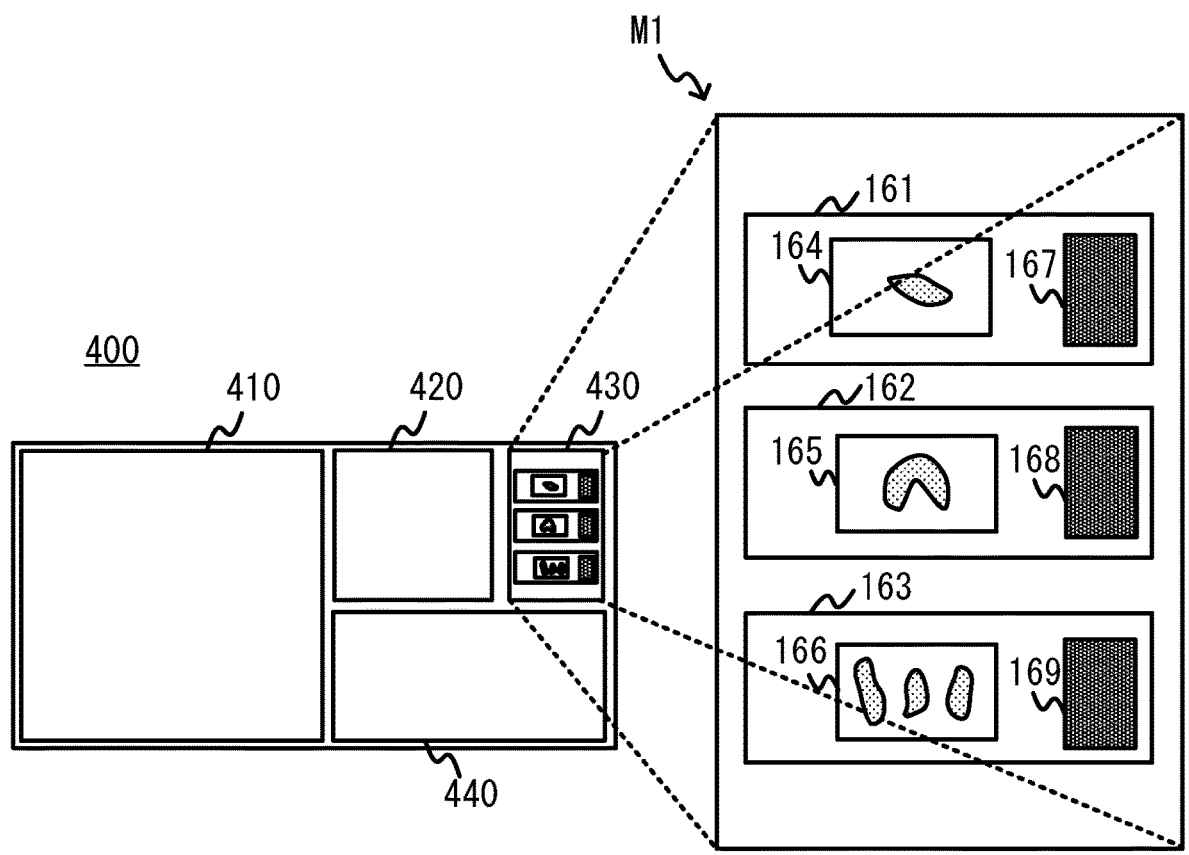
FIG. 6 is an example of a screen displayed on a display device 14.

FIG. 6 is an example of a screen displayed on the display device 14 in step S5. The screen 400 illustrated in FIG. 6 includes a micro image region 410, a map image region 420, a macro image region 430, and an operation region 440. The micro image region 410 is a region that displays micro images acquired by the micro image acquisition unit 300. The map image region 420 is a region that displays a map image generated by stitching together micro images. The macro image region 430 is a region that displays macro images acquired by the macro image acquisition unit 200. The operation region 440 is a region where graphical user interface (GUI) controls enabling the user to input instructions into the microscope system 1 are arranged. In step S5, a single macro image M1 generated by stitching together the two macro images acquired in step S4 is displayed in the macro image region 430 in an enlarged or reduced state to fit the size of the macro image region 430.

In the macro image M1 illustrated in FIG. 6, a situation is illustrated in which the container holder is the microscope slide holder 120, and three microscope slides (microscope slide 161, microscope slide 162, microscope slide 163) have been placed in the microscope slide holder 120. Also, a situation is illustrated in which a cover slip (cover slip 164, cover slip 165, cover slip 166) covering the specimen has been placed on each of the microscope slides, and additionally, a label (label 167, label 168, label 169) has been applied to each. Note that information for managing microscope slide specimens is printed or written on the labels. The labels are typically formed with a material such as paper having a low transmittance compared to a microscope slide, and consequently appear as particularly dark regions in the macro image M1.

When the macro image is displayed, the microscope system 1 performs a macro image analysis process (step S6). At this point, the computer 10 performs an image analysis process on the macro images acquired in step S4.

Figure 7:
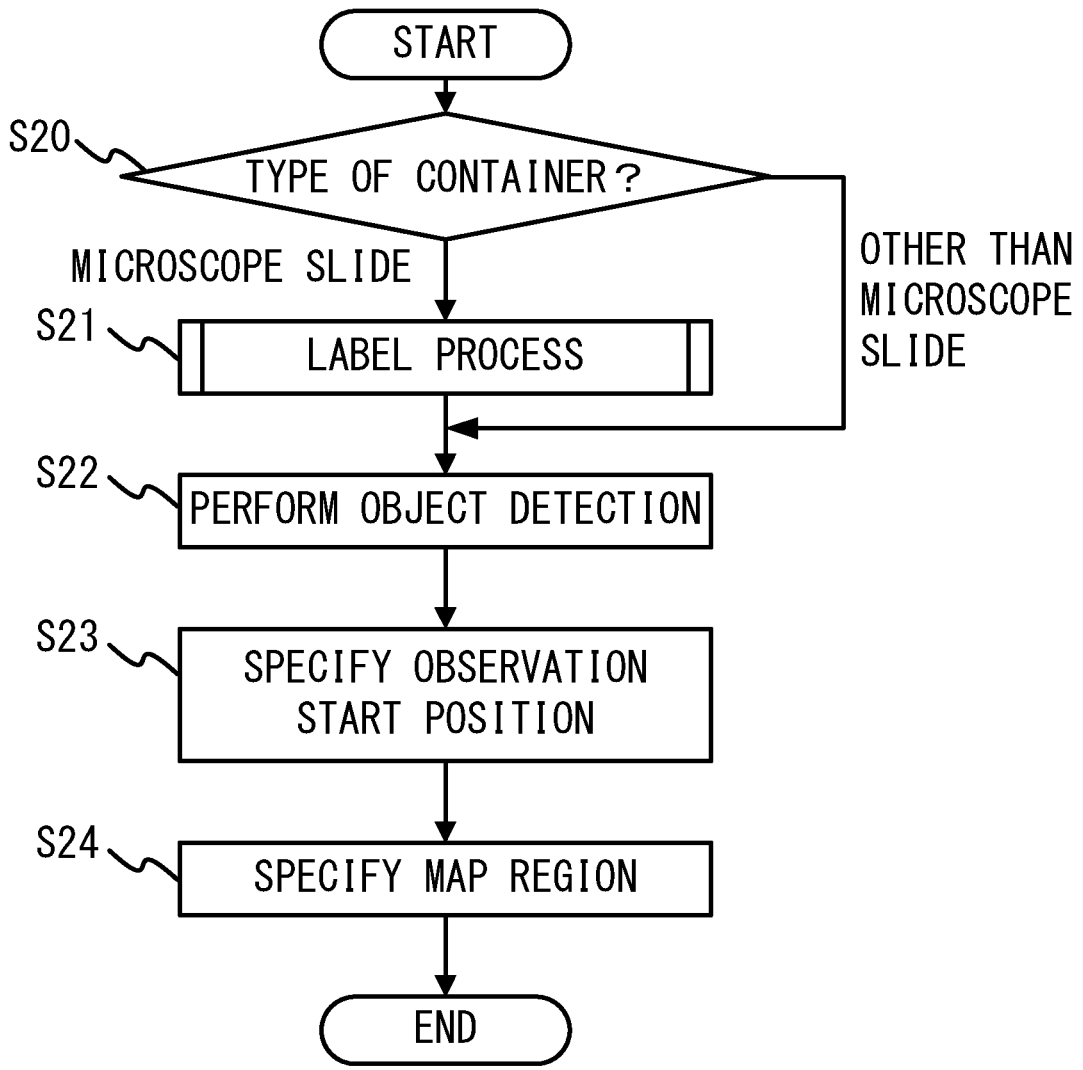
FIG. 7 is a diagram illustrating an example of a flowchart of the macro image analysis process performed by the microscope system 1.
Figure 8:
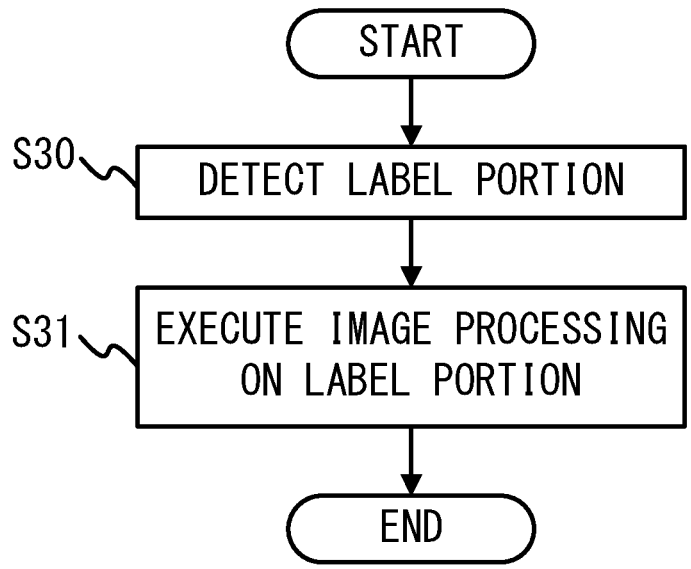
FIG. 8 is a diagram illustrating an example of a flowchart of a label process performed by the microscope system 1.
Figure 10A:
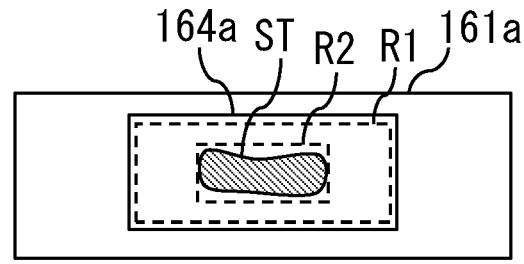
FIGS. 10A to 10D are diagrams for explaining a result of object detection with respect to a microscope slide specimen.
Figure 10B:
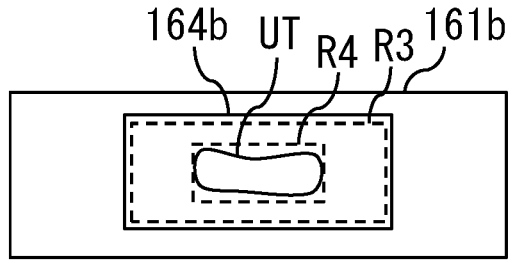
Figure 10C:
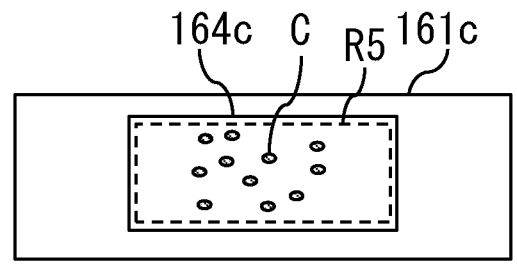
Figure 10D:
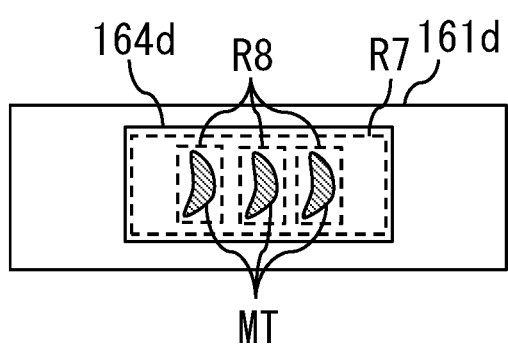
Figure 11A:
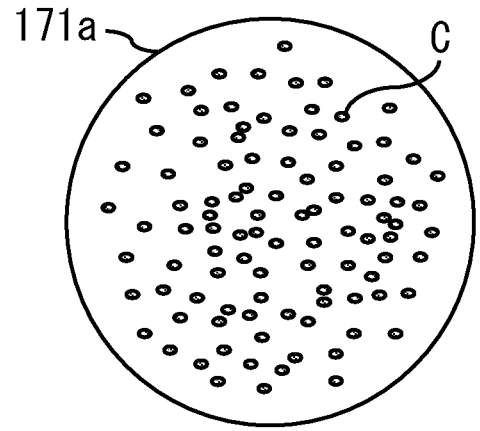
FIGS. 11A to 11C are diagrams for explaining a result of object detection with respect to a dish specimen.
Figure 11B:
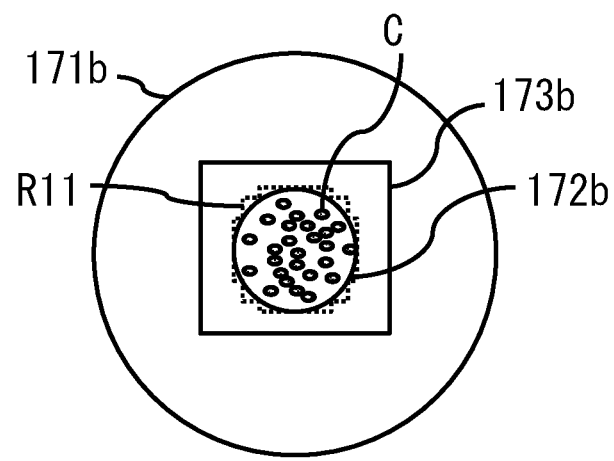
Figure 11C:
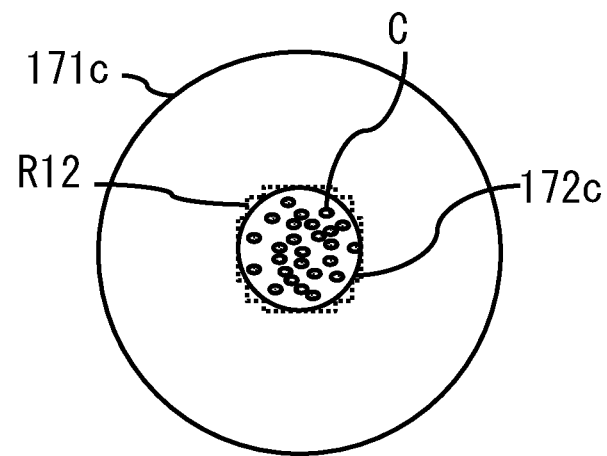
Figure 12:
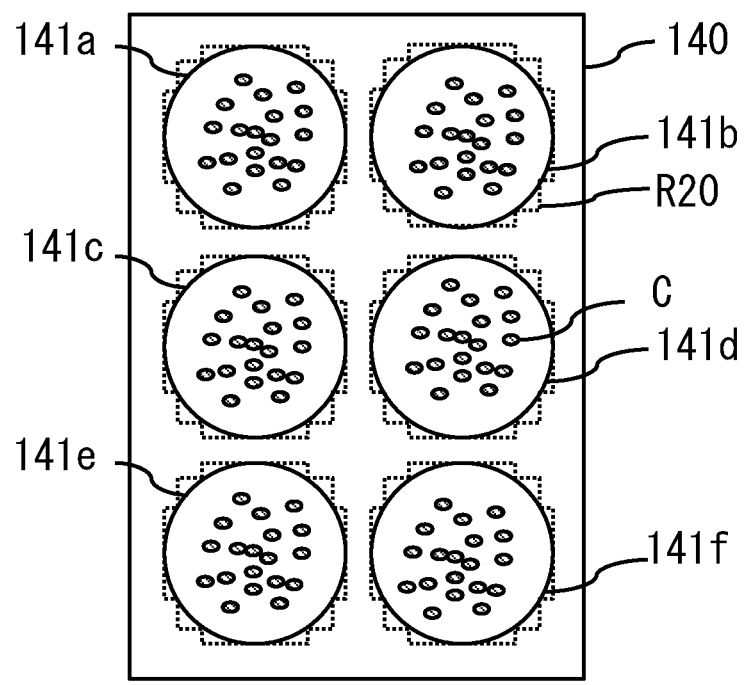
FIG. 12 is a diagram for explaining a result of object detection with respect to a multi-well plate specimen.

FIG. 7 is a diagram illustrating an example of a flowchart of the macro image analysis process performed by the microscope system 1. FIG. 8 is a diagram illustrating an example of a flowchart of a label process performed by the microscope system 1. FIG. 9 is a diagram illustrating an example of histograms before and after brightness correction. FIGS. 10A to 10D are diagrams for explaining a result of object detection with respect to a microscope slide specimen. FIGS. 11A to 11C are diagrams for explaining a result of object detection with respect to a dish specimen. FIG. 12 is a diagram for explaining a result of object detection with respect to a multi-well plate specimen. Hereinafter, the macro image analysis process performed in step S6 will be described with reference to FIGS. 7 to 12.

When the macro image analysis process illustrated in FIG. 7 is started, first, the microscope system 1 determines whether or not the type of specimen container is microscope slide (step S20). Here, the computer 10 determines whether or not the type is microscope slide on the basis of the type of specimen container specified in step S2. If the type of specimen container is determined to be microscope slide, the microscope system 1 performs a label process illustrated in FIG. 8 (step S21). On the other hand, if the type of specimen container is determined not to be microscope slide, the microscope system 1 skips step S21.

When the label process illustrated in FIG. 8 is started, first, the microscope system 1 detects the label portion on the microscope slide (step S30). Here, the computer 10 detects the region of the label applied to the microscope slide (label portion) from the macro image M1. Because the label transmits little to no light, the label portion appears as a particularly dark region in the macro image M1. For this reason, the computer 10 may detect a region having pixel values lower than a predetermined threshold included in the macro image M1 as the label portion. Also, because the label portion is expected to be somewhat large, the computer 10 may also detect a contiguous region having a certain area or more with pixel values lower than a predetermined threshold included in the macro image M1 as the label portion. Note that the method of detecting the label portion is not particularly limited to the above methods. The label portion may also be detected according to another method. For example, the computer 10 may detect a preset region as the label portion, or detect the label portion by a pattern matching process such as template matching. Additionally, the computer 10 may also detect the label portion by using an object detection method using deep learning, such as You Only Look Once (YOLO) or Single Shot Detector (SSD).

If the label portion is detected, the microscope system 1 executes image processing on the label portion (step S31). At this point, the computer 10 may also adjust the brightness of the label portion of the macro image M1, such as by increasing the gain of the label portion over the gain in other portions (by a factor of 10, for example) to enhance slight differences of brightness inside the label portion. With this arrangement, the macro image M1 is converted into a macro image M2 in which the information printed or written on the label stands out from the background. Note that to make the label information easier to see, a smoothing process or the like may also be performed on the label portion of the macro image M2 to remove noise, and furthermore the contrast may also be corrected.

The image processing performed in step S31 will be described in further detail with reference to FIG. 9 by taking the case of performing brightness adjustment as an example. A histogram H1 illustrated in FIG. 9 is an example of a histogram of pixel values of the macro image M1 before executing the image processing in step S31. A histogram H2 illustrated in FIG. 9 is an example of a histogram of pixel values of the macro image M2 after executing the image processing in step S31. As illustrated in FIG. 9, the histogram H1 of the macro image M1 of labeled microscope slide includes a peak P1 formed by the pixel values outside the label portion and a peak P2 formed by the pixel values of the label portion. By using image processing to adjust pixel values less than a threshold TH specified as the label portion, a peak P3 corresponding to the peak P2 has higher pixel values than the peak P2 in the histogram H2 after the image processing. Also, by using gain adjustment to adjust the pixel values, the distribution that includes the peak P3 has greater variance than the distribution that includes the peak P2. Consequently, in the macro image M2 after the image processing, the brightness of the label portion is raised, while in addition, by increasing the differences of brightness among the pixels of the label portion, it is possible to see the information printed or written on the label. Note that, compared to a method such as acquiring images respectively by trans-illumination and epi-illumination, for example, the label process illustrated in FIG. 8 that obtains the information in the label portion by adjusting the brightness of a part of the image through image processing has merits such as that necessary information can be obtained in a short time because of the reduced number of times imaging is performed, and costs can be reduced because a complex apparatus configuration is not required.

Thereafter, the microscope system 1 performs object detection on the macro image (step S22). Here, the computer 10 detects a structure corresponding to the type of specimen container specified in step S2, on the basis of the macro image M1 or the macro image M2. Furthermore, the computer 10 may detect a specimen placed in the specimen container and may also detect the staining state of the specimen, on the basis of the macro image M1 or the macro image M2.

In step S22, if the type of specimen container is microscope slide, the computer 10 detects a cover slip as the structure corresponding to the type of specimen container. Furthermore, a specimen is detected from the region inside the cover slip. It is desirable for the detection of the specimen to distinguish between a specimen stained with hematoxylin and eosin (HE) stain or the like (hereinafter referred to as a stained specimen) and an unstained specimen, for example. Note that an unstained specimen is a transparent specimen observed by phase contrast observation, for example, and may also be a specimen bonded to a fluorescent stain such as DAPI that is observed by fluorescence observation. In other words, it is desirable for the computer 10 to specify the position of an object from an macro image, and classify the object into at least three classes including stained specimen, unstained specimen, and cover slip.

For object detection with respect to a microscope slide, an object detection algorithm using deep learning such as You Only Look Once (YOLO) or Single Shot Detector (SSD) may be used, for example. With this arrangement, for example, in the case where the macro image shows a microscope slide specimen with a stained tissue ST sandwiched between a microscope slide 161a and a cover slip 164a, a range R1 of the cover slip 164a overlapping the microscope slide 161a and a range R2 of the stained tissue ST are detected, as illustrated in FIG. 10A. As another example, in the case where the macro image shows a microscope slide specimen with an unstained tissue UT sandwiched between a microscope slide 161b and a cover slip 164b, a range R3 of the cover slip 164b and a range R4 of the unstained tissue UT are detected, as illustrated in FIG. 10B. As another example, in the case where the macro image shows a microscope slide specimen with cells C sandwiched between a microscope slide 161c and a cover slip 164c, the macro image does not have a high enough resolution to recognize the cells C, and therefore only a range R5 of the cover slip 164c is detected, as illustrated in FIG. 10C. As another example, in the case where the macro image shows a microscope slide specimen with multiple tissues MT sandwiched between a microscope slide 161d and a cover slip 164d, a range R7 of the cover slip 164d and a range R8 of each of the multiple tissues MT are detected, as illustrated in FIG. 10D. The above object detection may be performed on the entire macro image or only on the region inside the microscope slide of the macro image. Note that the position of the microscope slide is restricted by the microscope slide holder 120, and therefore is known.

In step S22, in the case where the type of specimen container is dish, the computer 10 detects a hole part provided in the dish as the structure corresponding to the type of specimen container. Furthermore, a specimen is detected from the region of the hole part. It is desirable for the detection of the specimen to distinguish between a stained specimen and an unstained specimen, for example.

In other words, it is desirable for the computer 10 to specify the position of an object from an macro image, and classify the object into at least three classes including stained specimen, unstained specimen, and hole part. Note that a dish is also referred to as a laboratory dish or a Petri dish, and ordinarily is formed using a material such as glass or transparent plastic. Dishes are broadly classified into the three categories of a normal dish, a glass bottom dish, and a film bottom dish, depending on the structure of the bottom. Of these, a hole part exists in a glass bottom dish and a film bottom dish. In a glass bottom dish, a hole is formed in the bottom of the dish, and a cover slip is applied from underneath the dish to close up the hole. On the other hand, in a film bottom dish, the hole part is formed by solid casting at the bottom of the dish.

For object detection with respect to a dish, similarly to object detection with respect to a microscope slide, an object detection algorithm using deep learning such as You Only Look Once (YOLO) or Single Shot Detector (SSD) may be used, for example. With this arrangement, for example, in the case where the macro image shows a dish specimen in which cells C are contained in a normal dish 171a, neither the hole part nor the cells C are detected, as illustrated in FIG. 11A. As another example, in the case where the macro image shows a dish specimen in which cells C are contained in a hole part 172b of a glass bottom dish 171b with a cover slip 173b applied to the bottom, the cells C are not detected, but a range R11 of the hole part 172b is detected, as illustrated in FIG. 11B. As another example, in the case where the macro image shows a dish specimen in which cells C are contained in a film bottom dish 171c having a hole part 172c formed by solid casting, the cells C are not detected, but a range R12 of the hole part 172c is detected, as illustrated in FIG. 11C. The above object detection may be performed on the entire macro image or only on the region inside the dish of the macro image. Note that the position of the dish is restricted by the dish holder 130, and therefore is known.

In the case where the specimen placed in the dish is known in advance to be a specimen that is difficult to detect from the macro image, such as cells, the computer 10 may also specify only the position of the hole part. In this case, it is sufficient to be able to detect the circular shape of the hole part, and consequently another known technology such as circle detection by the Hough transform may be used instead of an object detection algorithm using deep learning. Additionally, the specimen may be detected by an object detection algorithm using deep learning, and the hole part may be detected by the Hough transform.

In step S22, in the case where the type of specimen container is a multi-well plate, the computer 10 detects wells as the structure corresponding to the type of specimen container. Furthermore, a specimen is detected from the regions of the wells. It is desirable for the detection of the specimen to distinguish between a stained specimen and an unstained specimen, for example. In other words, it is desirable for the computer 10 to specify the position of an object from an macro image, and classify the object into at least three classes including stained specimen, unstained specimen, and well.

For object detection with respect to a multi-well plate, similarly to object detection with respect to a microscope slide or a dish, an object detection algorithm using deep learning such as You Only Look Once (YOLO) or Single Shot Detector (SSD) may be used, for example. With this arrangement, for example, in the case where the macro image shows a multi-well plate specimen in which cells C are contained in the wells of a 6-well type multi-well plate 140, the cells C are not detected, but a range R20 of each of the six wells (141a to 141f) is detected, as illustrated in FIG. 12. Note that the positions of the wells in a multi-well plate depend on the number of wells. Also, even for multi-well plates having the same number of wells, the positions of the wells may be different depending on the manufacturer. Consequently, it is desirable for objection detection with respect to a multi-well plate to be performed on the entire macro image.

Note that although FIGS. 10A to 10D illustrate an example of specifying the ranges of detected objects using rectangles, the ranges of detected objects may also be specified using circles or another shape, for example. Also, as illustrated in FIGS. 11A to 12, the ranges of detected objects may also be specified in units of single pixel to match the object shape, without using a predetermined shape.

Additionally, it is sufficient to perform object detection with respect to at least one specimen container. For example, in the case where a plurality of specimen containers exist in the macro image, object detection may be performed only with respect to the specimen container at a position of highest priority according to a predetermined order of priority. In the case where a specimen container does not exist at the position of highest priority, object detection may be performed on the specimen container at the position of next-highest priority. Note that object detection may also be performed with respect to all specimen containers.

When the object detection ends, the microscope system 1 specifies an observation start position and a map region (step S23, step S24), and ends the macro image analysis process illustrated in FIG. 7. Here, the computer 10 specifies the observation start position according to the type of specimen container and the map region according to the type of specimen container, on the basis of the macro image. More specifically, the computer 10 performs object detection according to the type of specimen container on the macro image, and specifies the observation start position and the map region according to the type of specimen container on the basis of the result of the object detection.

Note that the observation start position refers to a position on the subject where the user the user is able to perform observation initially after instructing the microscope system 1 to start observation, when the microscope system 1 has finished the series of processes performed automatically and the user is able to operate the microscope system 1 manually. In other words, the observation start position is a position in the field of view or a central position in the field of view of the microscope system 1 in the state where the user him- or herself is able to operate the microscope system 1. Also, the map region refers to the region that is the subject of the map image displayed to enable the user to grasp the relationship between an overall image of the specimen and the current observation position when the user is performing observation, and normally is the region where the specimen exists or the region where the specimen is expected to exist. The map image is an image constructed by stitching together a plurality of images acquired at a higher observation magnification than the observation magnification of the macro image acquisition unit 200. Note that the plurality of images acquired in order to construct the map image are images acquired at the observation magnification when starting observation (second magnification), but are not limited thereto. The plurality of images acquired in order to construct the map image may also be images acquired at a magnification at or lower than the observation magnification when starting observation (second magnification), and are sufficiently images acquired at a higher magnification than the magnification of the macro image (first magnification).

In step S23, the computer 10 specifies the observation start position on the basis of the result of the object detection performed in step S22. Specifically, it is sufficient for the computer 10 to specify the observation start position on the basis of at least the detection result regarding the structure corresponding to the type of specimen container detected in step S22, and more preferably on the basis of the detection result regarding the structure corresponding to the type of specimen container detected in step S22 and the detection result regarding the specimen inside the specimen container. In other words, in the case where the specimen is detected successfully, the computer 10 uses information about the position and size of the specimen to specify a position where the specimen exists as the observation start position, and in the case where the specimen is not detected successfully, the computer 10 uses information about the position and size of the structure of the specimen container to estimate a position where the specimen exists, and specifies the estimated position as the observation start position.

For example, in the case where the type of specimen container is microscope slide, the computer 10 specifies the observation start position from inside the cover slip detected in step S22. More specifically, in the case where both the cover slip and the specimen are detected in step S22, as illustrated in the examples of FIGS. 10A, 10B, and 10D, the computer 10 specifies the center of the detected specimen as the observation start position. Note that in the case where a plurality of specimens are detected, as illustrated in the example of FIG. 10D, it is sufficient to specify the center of one of the specimens as the observation start position, for example. Also, because it is sufficient to specify a position on the specimen as the observation start position, the computer 10 may also further distinguish a center-of-gravity position of the specimen and a lesion in the specimen, and specify these positions (the center-of-gravity position and the position of the lesion) as the observation start position. Also, in the case where only the cover slip is detected in step S22, as illustrated in the example of FIG. 10C, the computer 10 specifies the center of the cover slip where the specimen likely exists as the observation start position.

For example, in the case where the type of specimen container is dish, the computer 10 specifies the observation start position from inside the dish, and furthermore in the case where the hole part is detected in step S22, the computer 10 specifies the observation start position from inside the hole part. More specifically, in the case where the hole part is detected in step S22, as illustrated in the example of FIGS. 11B and 11C, the computer 10 specifies the center of the detected hole part as the observation start position. Also, in the case where the hole part is not detected in step S22, as illustrated in the example of FIG. 11A, the computer 10 specifies the center of the dish as the observation start position.

For example, in the case where the type of specimen container is multi-well plate, the computer 10 specifies the observation start position from inside wells of the multi-well plate. More specifically, the computer 10 selects a well from among the multiple wells detected in step S22, and specifies the center of the well as the observation start position. The well may be selected according to a predetermined rule, such as selecting the well positioned closest to the center of the multi-well plate for example, or the well may be selected on the basis of the detection result of the object detection, such as selecting the well where a specimen is detected.

For example, in the case where the type of specimen container is another specimen container, the computer 10 specifies the center of the opening 151 of the general-purpose container holder 150 as the observation start position. Note that because the position of the opening 151 of the general-purpose container holder 150 is known, in the case where the type of specimen container is another specimen container, the object detection in step S22 may be skipped. However, because it is also possible to estimate the opening 151 from information such as the distribution of pixel values in the macro image, the observation start position may also be specified using the detection result of object detection even in the case where the type of specimen container is another specimen container.

In step S24, the computer 10 specifies the map region on the basis of the result of the object detection performed in step S22. Specifically, it is sufficient for the computer 10 to specify the map region on the basis of at least the detection result regarding the structure corresponding to the type of specimen container detected in step S22, and more preferably on the basis of the detection result regarding the structure corresponding to the type of specimen container detected in step S22 and the detection result regarding the specimen inside the specimen container. In other words, in the case where the specimen is detected successfully, the computer 10 uses information about the position and size of the specimen to specify a region where the specimen exists as the map region, and in the case where the specimen is not detected successfully, the computer 10 uses information about the position and size of the structure of the specimen container to estimate a region where the specimen exists, and specifies the estimated region as the map region.

For example, in the case where the type of specimen container is microscope slide, the computer 10 specifies the map region from inside the cover slip detected in step S22. More specifically, in the case where both the cover slip and the specimen are detected in step S22, as illustrated in the examples of FIGS. 10A, 10B, and 10D, the computer 10 specifies the range of the detected specimen (range R2, range R4, range R8) as the map region. Additionally, the computer 10 may also further distinguish a lesion in the specimen, and specify the range of the lesion as the map region. Also, in the case where only the cover slip is detected in step S22, as illustrated in the example of FIG. 10C, the computer 10 specifies all or part of the range of the cover slip as the map region.

For example, in the case where the type of specimen container is dish, the computer 10 specifies the map region from inside the dish, and furthermore in the case where the hole part is detected in step S22, the computer 10 specifies the map region from inside the hole part. More specifically, in the case where the hole part is detected in step S22, as illustrated in the example of FIGS. 11B and 11C, the computer 10 specifies the entire range of the detected hole part (range R11, range R12) or a predetermined range from the center of the hole part as the map region. Also, in the case where the hole part is not detected in step S22, as illustrated in the example of FIG. 11A, the computer 10 specifies a predetermined range from the center of the dish as the map region.

For example, in the case where the type of specimen container is multi-well plate, the computer 10 specifies the map region from inside wells of the multi-well plate. More specifically, the computer 10 specifies the entire range of the well selected in step S23 or a predetermined range from the center of the well as the map region.

For example, in the case where the type of specimen container is another specimen container, the computer 10 specifies the map region from inside a predetermined range of the opening 151 of the general-purpose container holder 150. More specifically, it is sufficient for the computer 10 to specify all or part of the entire range of the opening 151 as the map region.

When the macro image analysis process ends, the microscope system 1 changes the settings of the microscope system 1 to settings suited to observation by the user (step S7). FIG. 13 is a diagram illustrating another example of a table for selecting the parameters of the motorized stage 101. FIG. 14 is a diagram illustrating yet another example of a table for selecting the parameters of the motorized stage 101. FIG. 15 is a diagram illustrating an example of a table for selecting an observation method for micro observation. Hereinafter, a specific example of changing the settings will be described with reference to FIGS. 13 to 15.

In step S7, the computer 10 may also update the parameters of the motorized stage 101 on the basis of the detection result of the object detection, for example. In the case where information related to the size of the specimen container is obtained by the object detection, as illustrated in FIG. 13, tables T2 to T5 may be referenced instead of the table T1 referenced in step S3 to read out a parameter set accounting for the size of the specimen container in addition to the type of specimen container, and set the parameter set in the microscope system 1. Also, in the case where information related to the type of specimen is obtained by the object detection, as illustrated in FIG. 14, a table T6 may be referenced instead of the table T1 referenced in step S3 to read out a parameter set accounting for the type of specimen, and set the parameter set in the microscope system 1.

Note that, among the tables T2 to T5, the parameter set PS5 stored in the table T2 for a microscope slide and the parameter set PS15 stored in the table T5 for another specimen container are the same as the parameter set PS1 for a microscope slide stored in the table T1 and the parameter set PS4 for another specimen container stored in the table T1, respectively. On the other hand, different parameter sets for each size of specimen container are stored in the table T3 and the table T4. Specifically, in the table T3 for a dish, parameter sets (parameter set PS6 to parameter set PS9) for moving the motorized stage 101 more slowly or gradually for larger diameters of the dish are stored. This is because the liquid surface is susceptible to slower and larger disturbances in a dish of greater diameter compared to a dish of lesser diameter, and there is a larger adverse influence on image quality. Also, in the table T4 for a multi-well plate, parameter sets (parameter set PS10 to parameter set PS14) for moving the motorized stage 101 more slowly or gradually for a multi-well plate having fewer wells (that is, having larger wells) are stored. This is because the liquid surface is susceptible to slower and larger disturbances in the case where there are fewer wells compared to more wells, and there is a larger adverse influence on image quality.

Also, in the table T6, parameter sets for each type of specimen are stored. Specifically, a parameter set PS16 for a floating specimen, a parameter set PS17 for an adhesive specimen, and a parameter set PS18 for a specimen not in liquid are stored, and the values indicated by these parameter sets move the motorized stage 101 more quickly and forcefully in the above reverse order. This is because a specimen not in liquid is not easily disturbed by the movement of the motorized stage 101, and the influence on the image quality is small even if the motorized stage 101 is moved quickly. Also, because an adhesive specimen is not disturbed by a disturbance of the liquid as much as a floating specimen, the influence on the image quality associated with the movement of the motorized stage 101 can be kept relatively small.

In step S7, the computer 10 changes the settings of the observation method of the microscope 100 on the basis of the detection result of the object detection, for example, and the microscope controller 20 may place an objective lens and a condenser lens corresponding to the observation method on the optical path in accordance with instructions from the computer 10. In the case where the staining state of the specimen is detected by the object detection, the computer 10 may also reference the table T7 illustrated in FIG. 15 to change the settings of the observation method of the micro image acquisition unit 300 to an observation method according to the result of detecting the staining state.

In the table T7, parameter sets indicating a desirable observation method for each staining state of a specimen are stored. Specifically, a parameter set PS21 for a stained specimen, a parameter set PS22 for an unstained specimen, and a parameter set PS23 for when a specimen is not detected are stored. Note that the parameter set PS21 indicates bright-field observation. This is because a stained specimen is observable by bright-field observation. Also, the parameter set PS22 indicates phase contrast observation. This is because for an unstained specimen, observation is thought to be more favorable with the phase contrast observation than bright-field observation. Also, the parameter set PS23 indicates phase contrast observation. This is because in the case where a specimen is not detected, favorable observation is difficult with bright-field observation, and observation by phase contrast observation is desirable.

When the change of settings in step S7 ends, the microscope system 1 updates the macro image display (step S8). Here, the computer 10 displays a screen 400a illustrated in FIG. 16, which includes the macro image, a display (cross lines CL) indicating the observation start position, and a display (bounding box BB) indicating the range of the map region, on the display device 14.

Figure 16:
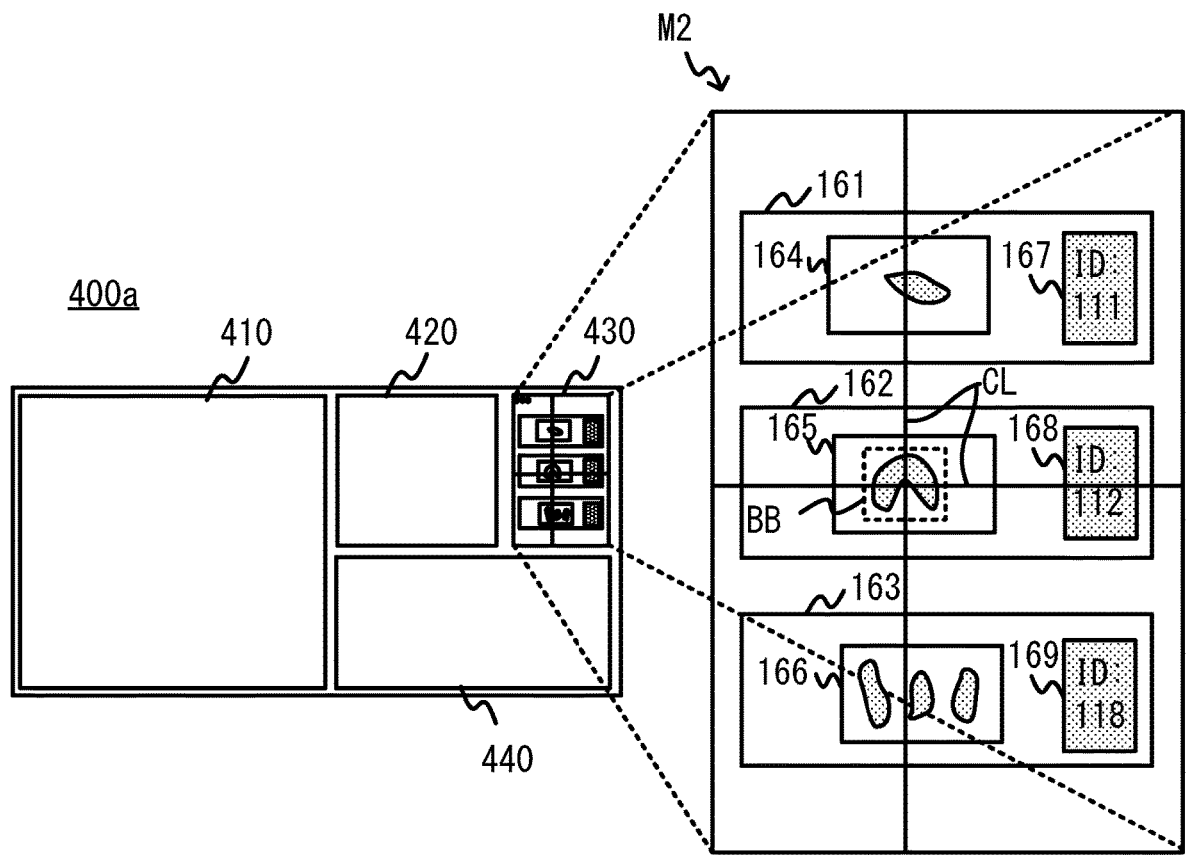
FIG. 16 is another example of a screen displayed on the display device 14.

FIG. 16 is an example of a screen displayed on the display device 14 in step S8. The screen 400a illustrated in FIG. 16 includes the micro image region 410, the map image region 420, the macro image region 430, and the operation region 440, similarly to the screen 400 illustrated in FIG. 6. The screen 400a differs from the screen 400 in that the macro image M2 is displayed in the macro image region 430 instead of the macro image M1, and in that the display (cross lines CL) indicating the observation start position and the display (bounding box BB) indicating the range of the map region are superimposed onto the macro image M2.

Note that the macro image M2 is an image obtained by performing the label process on the macro image M1, and as illustrated in FIG. 16, differs from the macro image M1 in that the information written on the label 167, the label 168, and the label 169 is visible. Also, on the screen 400a, the cross lines CL are illustrated as an example of a display indicating the observation start position, but the method of displaying the observation start position is not particularly limited. The observation start position may also be displayed according to a different method. Also, on the screen 400a, the bounding box BB is illustrated as an example of a display indicating the range of the map region, but the method of displaying the map region is not particularly limited. The map region may also be displayed according to a different method.

Thereafter, the microscope system 1 moves the specimen container placed in the container holder retaining unit 110 to a micro shooting position (step S9). Here, the computer 10 controls the microscope controller 20 to cause the microscope controller 20 to move the motorized stage 101 such that the container holder retaining unit 110 is positioned on the optical axis of the micro image acquisition unit 300. More specifically, the computer 10 controls the relative position of the micro image acquisition unit 300 with respect to the specimen such that the observation start position specified in step S23 is included in the field of view at the second magnification of the micro image acquisition unit 300, and more preferably controls the relative position such that the observation start position specified in step S23 is position in the center of the field of view. Note that at this time, the microscope controller 20 controls the movement of the motorized stage 101 according to the settings of step S7, regardless of the type of specimen container.

After moving to the micro shooting position, the microscope system 1 performs focusing (step S10). The focusing method is not particularly limited, and the revolving nosepiece 306 may be moved to a predetermined position for each specimen container, and focusing may be performed using known autofocus technology. Note that in the case where the specimen container is a multi-well plate, the height from the bottom of the well may be inconsistent depending on the manufacturer or individual differences. Consequently, it is desirable to use autofocus technology rather than moving the revolving nosepiece 306 to a predetermined position.

When the focusing at the micro shooting position ends, the microscope system 1 starts a live display of the micro image (step S11). Here, the computer 10 controls the imaging device 307 through the microscope controller 20 to cause the micro image acquisition unit 300 to acquire a micro image at a predetermined frame rate. Additionally, a screen 400b illustrated in FIG. 17 that includes an acquired micro image M3 is displayed on the display device 14.

Figure 17:
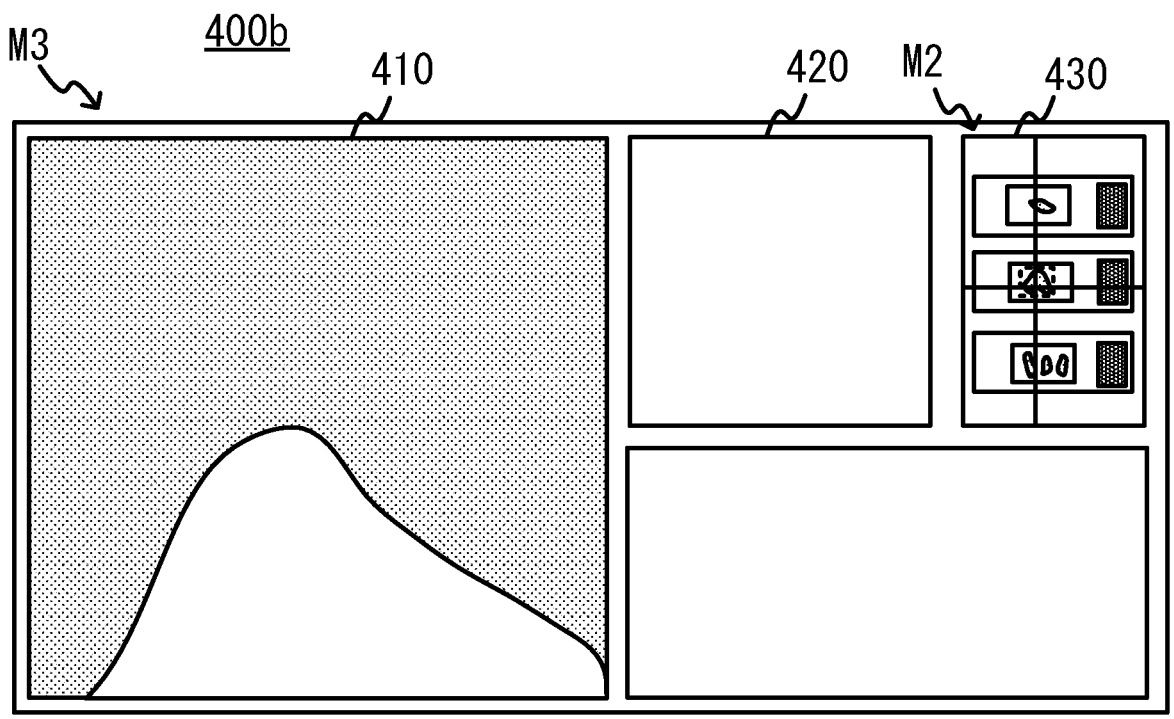
FIG. 17 is yet another example of a screen displayed on the display device 14.

FIG. 17 is an example of a screen displayed on the display device 14 in step S11. The screen 400b illustrated in FIG. 17 includes the micro image region 410, the map image region 420, the macro image region 430, and the operation region 440, similarly to the screen 400a illustrated in FIG. 16. The screen 400b differs from the screen 400a in that the micro image M3 is displayed in the micro image region 410.

When the live display is started, the microscope system 1 is operable by the user, and the microscope system 1 briefly enters a standby state standing by for input from the user. In other words, if the user instructs the microscope system 1 to start observation, the series of processes from step S1 to step S11 is performed by the microscope system 1, and a screen including a macro image and a micro image is displayed on the display device 14. With this arrangement, the user is able to start observation of the specimen from an observation position corresponding to the specimen container, without having to perform laborious work.

The user judges whether or not the map region indicated by the bounding box BB is appropriate while looking at the screen 400b, and adjusts the map region if necessary. Additionally, the user may also adjust other conditions for acquiring a map image. The microscope system 1 determines whether or not the user has given an instruction to change the settings of the conditions for acquiring a map image (step S12), and if an instruction to change the settings is given, the microscope system 1 changes the settings according to the instruction (step S13). Note that at this point, the changed conditions for acquiring a map image include not only the map region but also various settings of the micro image acquisition unit 300, such as the observation magnification, the observation method, the objective lens used for shooting, the amount of illuminating light, the exposure time, the exposure mode, the gain, and the resolution, for example.

The map region may be adjusted by having the user specify any range as the map region, or by having the user select a map region candidate as the map region from among multiple different map region candidates specified by the microscope system 1. Specifically, in the case where the multiple tissues MT are detected by the object detection, as illustrated in FIG. 10D, each of multiple regions corresponding to the multiple tissues MT may be treated as the map region candidates, and one of the multiple map region candidates may be selected as the map region. In addition, two or more regions corresponding to two or more tissues from among the multiple map region candidates may also be selected as a single map region. In this case, it is desirable to select a single region newly created by joining the two or more separated regions as the map region.

If the user gives an instruction to acquire a map image, the microscope system 1 starts map image acquisition (step S14). Here, the computer 10 controls the microscope controller 20 to move the field of view of the micro image acquisition unit 300 to each position of the map region sequentially and cause the micro image acquisition unit 300 to acquire a micro image at each position, and thereby shoot the map region without gaps. Furthermore, the computer 10 constructs a map image by stitching together the plurality of micro images acquired by the micro image acquisition unit 300.

Note that in step S14, the computer 10 determines the positions at which the micro image acquisition unit 300 acquires the micro images such that the plurality of micro images to be acquired overlap each other by a fixed amount or more. By determining the shooting positions in this way, the computer 10 is capable of favorably correcting misalignments that may occur when stitching together the micro images. To determine stitching positions at which misalignments are favorably corrected, a known template matching method or the like may be used, and additionally, to stitch images together, a technique known as feathering that combines images with a weighting applied according to the distance from the center of the images may be used.

Figure 20:
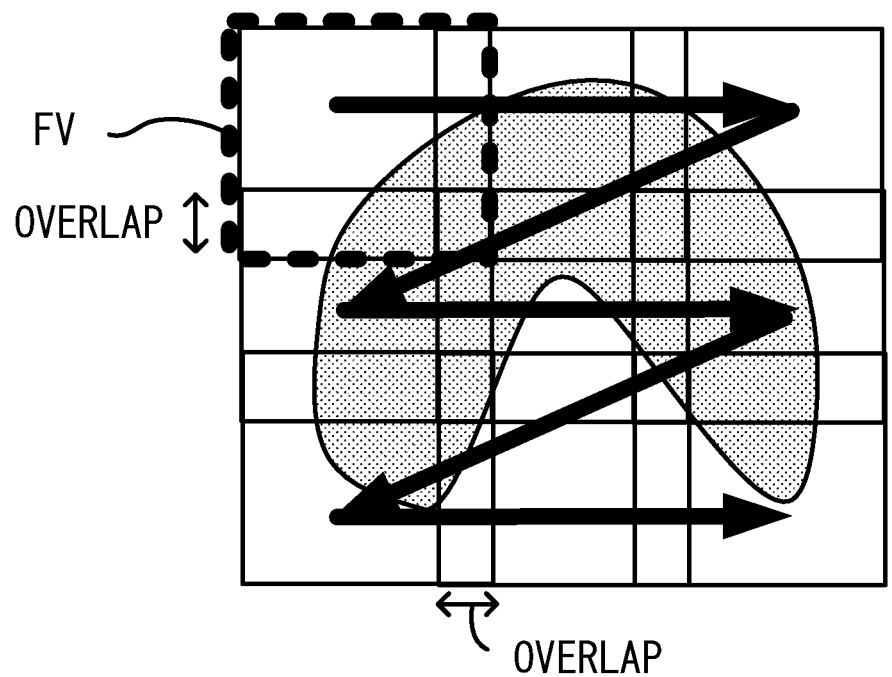
FIG. 20 is a diagram for explaining yet another example of a scanning method that scans a map region.

Also, in step S14, the computer 10 may select a method of determining the order in which to move among the shooting positions (in other words, the method of scanning the map region) from among a plurality of methods like those illustrated in FIGS. 18 to 20. For example, the computer 10 may move a field of view FV of the micro image acquisition unit 300 in a tornado mode as illustrated in FIG. 18. In tornado mode, the field of view FV moves from the inside out while rotating clockwise or counterclockwise from the center of the map region. As another example, the computer 10 may move the field of view FV in a meander mode as illustrated in FIG. 19. In meander mode, the field of view FV moves from edge to edge inside the map region in a sub scanning direction, and then the field of view FV shifts in a main scanning direction, with this motion being repeated while reversing the direction of the movement in the sub scanning direction with every repetition. As another example, the computer 10 may also move the field of view FV in a typical raster scan mode as illustrated in FIG. 20. Note that the user is able to end the map image acquisition at any timing, even while operating in any one of the modes. In the case where the map image acquisition ends partway through, the computer 10 may construct a map image by stitching together the already-acquired images. Also, after the end of map image acquisition, the computer 10 may control the relative position of the micro image acquisition unit 300 with respect to the specimen such that the observation start position specified in step S23 is included in the field of view of the micro image acquisition unit 300. With this arrangement, the current observation position can be reverted to the observation position before the map image acquisition was started.

When the map image acquisition ends, the microscope system 1 displays the map image (step S15), and ends the observation preparation process illustrated in FIG. 4. At this point, the computer 10 displays a screen 400c illustrated in FIG. 21 that includes a map image M4 constructed in step S14 on the display device 14.

Figure 21:
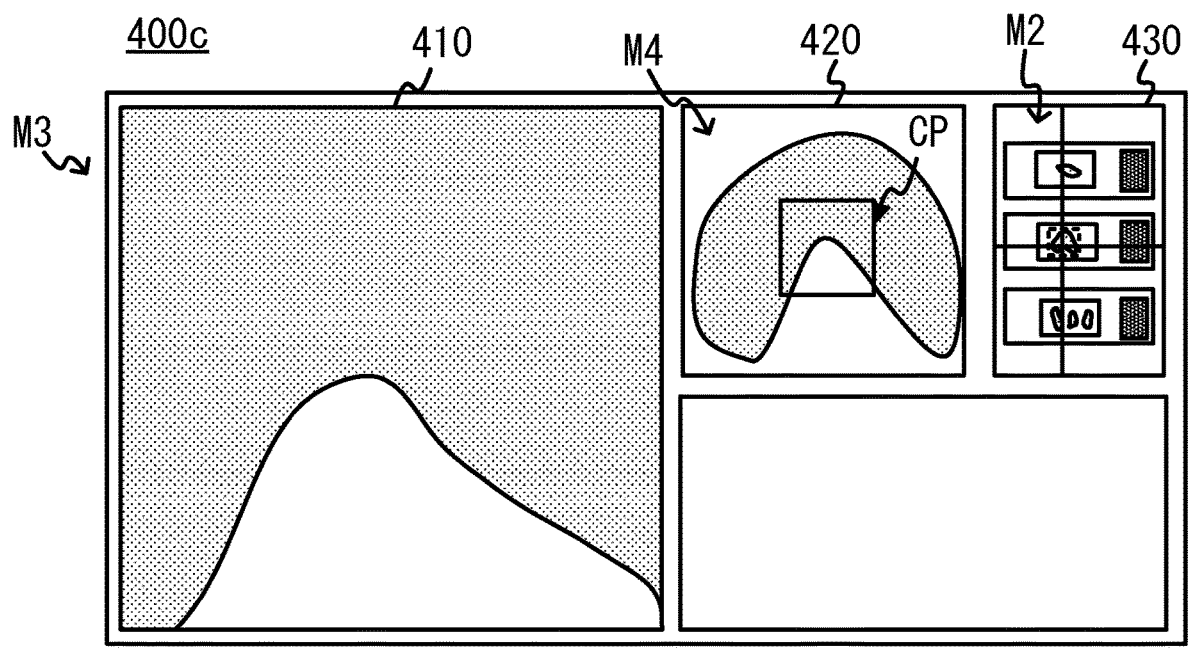
FIG. 21 is yet another example of a screen displayed on the display device 14.

FIG. 21 is an example of a screen displayed on the display device 14 in step S15. The screen 400c illustrated in FIG. 21 includes the micro image region 410, the map image region 420, the macro image region 430, and the operation region 440, similarly to the screen 400b illustrated in FIG. 17. The screen 400c differs from the screen 400b in that the map image M4 is displayed in the map image region 420. Note that the map image M4 preferably includes a display CP indicating the current observation position. With this arrangement, the user is easily able to grasp which area of the entire specimen is being observed.

Figure 22:
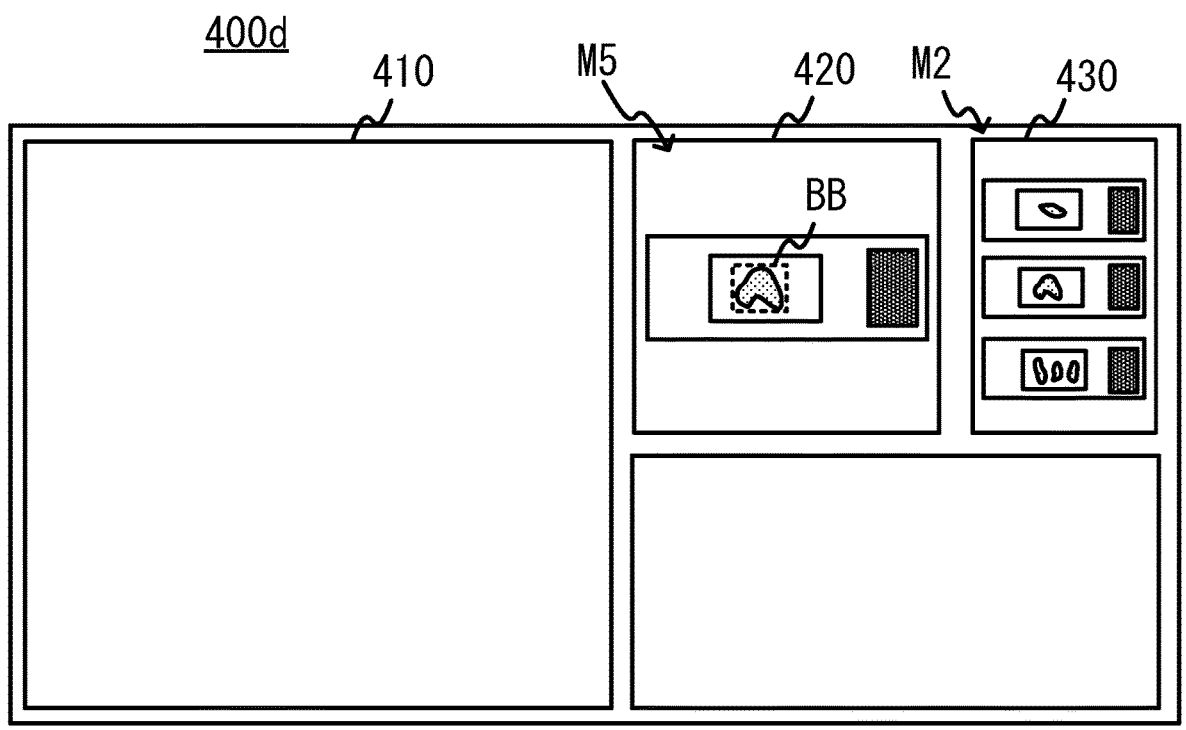
FIG. 22 is yet another example of a screen displayed on the display device 14.

FIG. 22 is another example of a screen displayed on the display device 14 in step S8. FIG. 16 illustrates an example in which a display (cross lines CL) indicating the observation start position and a display (bounding box BB) indicating the range of the map region are superimposed onto the macro image M2 updated in step S8, but the work of adjusting the map region by the user may also be performed in the map image region 420 rather than the macro image region 430. For example, in step S8, in addition to updating the macro image M2, an image of the specimen container that includes the map region (hereinafter referred to as the macro image M5) may be extracted from the macro image M2, and a process of displaying the extracted macro image M5 in the map image region 420 may be performed, as illustrated in FIG. 22. In this case, the display (bounding box BB) indicating the range of the map region may be superimposed onto the displayed macro image M5. By checking the micro image M5 on which the bounding box BB is superimposed, the user may judge whether or not the map region is appropriate, and also adjust the map region manually if necessary. In this way, by displaying a portion of the macro image M2 together with the bounding box in the map image region 420 before acquiring the map image, the map region is enlarged further and displayed, thereby enabling the user to utilize the regions on a screen 400d effectively to perform the work of checking the appropriateness of the map region and adjusting the map region.

Note that it is sufficient for the image of a single specimen container to be displayed in the map image region 420. In the case where the macro image region 430 contains the images of a plurality of specimen containers, the image of any specimen container selected by the user may be displayed in the map image region 420, and the user may specify the map region from among the displayed image of the specimen container.

Figure 23:
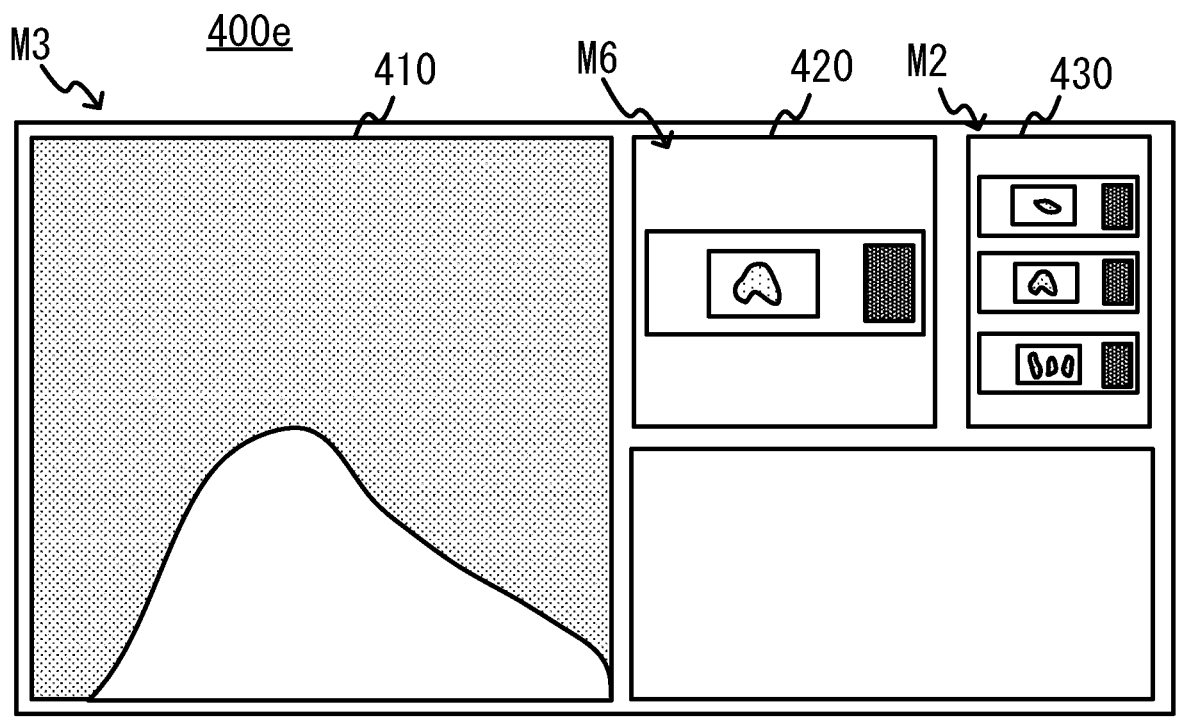
FIG. 23 is yet another example of a screen displayed on the display device 14.

FIG. 23 is another example of a screen displayed on the display device 14 in step S15. Although FIG. 21 illustrates an example in which the map image M4 corresponding to the map region is enlarged or reduced to fit the size of the map image region 420, an image outside the map region may also be included in the map image displayed in the map image region 420. For example, in the case of displaying the micro image M5 in the map image region 420 before acquiring the map image, as illustrated in FIG. 22, after acquiring the map image, the map region in the micro image M5 may be updated by the acquired map image to thereby display a map image M6 in the map image region 420. In this case, the map image M6 is constructed from the map image of the map region and the macro image outside the map region.

As above, in the observation preparation process illustrated in FIG. 4, a position suited to the observation of a specimen is specified by using information such as the type of specimen container, and the field of view is moved to the specified position. Consequently, it is possible to skip the specimen search that has been performed manually by the user in microscope systems of the related art, and the user is able to start observation of the specimen using the microscope system 1 without performing complicated work. Also, in the observation preparation process illustrated in FIG. 4, a range in which a specimen exists is specified by using information such as the type of specimen container, and the specified range is proposed to the user as a map region, that is, a range in which a map image should be acquired. Consequently, in many cases, it is possible for the user to cause the microscope system 1 to construct a map image simply by confirming that the map region is set appropriately, and the user can be saved the time and effort of searching for and setting the map region. Also, because the map image is constructed and displayed on the screen by a simple operation, the user is able to start close observation of the specimen easily and in a short time.

The embodiment described above illustrates a specific example for facilitating the understanding of the present invention, and embodiments of the present invention are not limited thereto. Various modifications and alterations of a microscope system, a control method, and a recording medium are possible without departing from the scope of the claims.

FIG. 1 illustrates an example of the microscope system 1 provided with the macro image acquisition unit 200 and the micro image acquisition unit 300, but it is sufficient for the microscope system to be provided with an image acquisition unit that acquires images at least at a first magnification and a second magnification higher than the first magnification. For this reason, it is not strictly necessary to provide a macro image acquisition unit and a micro image acquisition unit independently, and for example, a microscope 500 that acquires macro images and micro images by switching the objective lens used to shoot may be provided, like in a microscope system 2 illustrated in FIG. 24. Note that the microscope system 2 is provided with components such as a light source 501, a condenser lens 502, a plurality of objective lenses (objective lens 504 to objective lens 506), a revolving nosepiece 507, and an imaging device 508, and is capable of acquiring images by a plurality of observation methods. An observation preparation process similar to the microscope system 1 is also performed by the microscope system 2, thereby enabling the user to start the observation of a specimen without performing complicated work. Furthermore, the microscope included in the microscope system may also be a scanning microscope.

Also, FIG. 4 illustrates an example in which, after the user gives an instruction to start observation, in step S2, identification information that identifies the type of specimen container is acquired, and the type of specimen container is specified on the basis of the identification information, but the process of acquiring identification information and specifying the type of specimen container may also be performed before the user gives the instruction to start observation.

Also, FIG. 4 illustrates an example in which, in step S2, a detection unit provided in the microscope system 1 acquires identification information by detecting an identification structure provided in the container holder or the specimen container, but the identification information may also be acquired by having the user operate the input device. For example, the computer 10 may also acquire input information as identification information by having the user use the input device to input the type of specimen container. Also, in step S2, an example is illustrated in which the detection unit is a sensor such as a Hall-effect sensor, but the detection unit may also be an image acquisition unit. For example, the identification information may also be a macro image acquired by the image acquisition unit, and the computer 10 may identify the type of specimen container on the basis of the macro image.

Also, FIG. 4 illustrates an example of specifying the type of specimen container after moving to the macro shooting position, but it is sufficient to perform the process of specifying the type of specimen container at least before the macro image analysis process. Consequently, for example, the type of specimen container may be specified before moving to the macro shooting position.

Also, FIG. 7 illustrates an example of performing the label process only in the case where the type of specimen container is microscope slide, but the label process may also be performed on a specimen container other than a microscope slide. For example, the label process may also be performed on a label applied to a region other than the wells of a multi-well plate.

What is claimed is:

1. A microscope system comprising:
a microscope that acquires images at least at a first magnification and a second magnification higher than the first magnification; and
a processor,
wherein:
the processor is configured to specify a type of a container in which a specimen is placed, and
when starting observation of the specimen placed in the container at the second magnification, the processor is further configured to:
specify an observation start position by performing object detection according to the type of container on a first image that includes the container acquired by the microscope at the first magnification, and
control a relative position of the microscope with respect to the specimen such that the observation start position is contained in a field of view at the second magnification of the microscope.

2. The microscope system according to claim 1, wherein the processor is configured to:
detect a structure corresponding to the type of the container based on the first image, and
specify the observation start position based at least on a result of detecting the structure.

3. The microscope system according to claim 2, wherein the processor is configured to:
detect the specimen placed in the container based on the first image, and
specify the observation start position based on the result of detecting the structure and a result of detecting the specimen.

4. The microscope system according to claim 3, wherein the structure corresponding to the type of the container is (i) a cover slip in a case where the type of the container is a microscope slide, (ii) a hole part provided in a dish in a case where the type of the container is the dish, and (iii) a well in a case where the type of the container is a multi-well plate.

5. The microscope system according to claim 2, wherein the structure corresponding to the type of the container is (i) a cover slip in a case where the type of the container is a microscope slide, (ii) a hole part provided in a dish in a case where the type of the container is the dish, and (iii) a well in a case where the type of the container is a multi-well plate.

6. The microscope system according to claim 2, wherein the processor is configured to, in a case where the type of the container is a microscope slide:
specify the observation start position from inside a cover slip overlapping the microscope slide, and
control the relative position such that the observation start position specified from inside the cover slip is contained in the field of view at the second magnification.

7. The microscope system according to claim 2, wherein the processor is configured to, in a case where the type of the container is a dish:
specify the observation start position from inside the dish, and
control the relative position such that the observation start position specified from inside the dish is contained in the field of view at the second magnification.

8. The microscope system according to claim 2, wherein the processor is configured to, in a case where the type of the container is a dish:
specify the observation start position from inside a hole part provided in the dish, and
control the relative position such that the observation start position specified from inside the hole part is contained in the field of view at the second magnification.

9. The microscope system according to claim 2, wherein the processor is configured to, in a case where the type of the container is a multi-well plate:
specify the observation start position from inside a well provided in the multi-well plate, and
control the relative position such that the observation start position specified from inside the well is contained in the field of view at the second magnification.

10. The microscope system according to claim 2, wherein the processor is configured to:
detect a staining state of the specimen placed in the container based on the first image, and
change a setting of an observation method of the microscope to an observation method corresponding to a result of detecting the staining state.

11. The microscope system according to claim 1, wherein the processor is configured to, in a case where the type of the container is a microscope slide:
specify the observation start position from inside a cover slip overlapping the microscope slide, and
control the relative position such that the observation start position specified from inside the cover slip is contained in the field of view at the second magnification.

12. The microscope system according to claim 1, wherein the processor is configured to, in a case where the type of the container is a dish:
specify the observation start position from inside the dish, and
control the relative position such that the observation start position specified from inside the dish is contained in the field of view at the second magnification.

13. The microscope system according to claim 1, wherein the processor is configured to, in a case where the type of the container is a dish:
    specify the observation start position from inside a hole part provided in the dish, and
    control the relative position such that the observation start position specified from inside the hole part is contained in the field of view at the second magnification.

14. The microscope system according to claim 1, wherein the processor is configured to, in a case where the type of the container is a multi-well plate:
    specify the observation start position from inside a well provided in the multi-well plate, and
    control the relative position such that the observation start position specified from inside the well is contained in the field of view at the second magnification.

15. The microscope system according to claim 1, wherein the processor is configured to:
    detect a staining state of the specimen placed in the container based on the first image, and
    change a setting of an observation method of the microscope to an observation method corresponding to a result of detecting the staining state.

16. The microscope system according to claim 1, further comprising:
    a detection unit that outputs identification information identifying the type of the container by detecting an identification structure provided in a container holder that holds the container or in the container,
    wherein the processor is configured to specify the type of the container based on the identification information outputted by the detection unit.

17. The microscope system according to claim 16, wherein:
    the identification structure is a magnet, and
    the detection unit is a magnetic sensor.

18. The microscope system according to claim 1, wherein the processor is configured to specify the type of the container based on the first image.

19. A control method, executed by a computer, of a microscope system provided with a microscope that acquires images at least at a first magnification and a second magnification higher than the first magnification, the control method comprising:
    specifying a type of a container in which a specimen is placed;
    when starting observation of the specimen placed in the container at the second magnification, specifying an observation start position according to the type of the container by performing object detection according to the type of container on a first image that includes the container acquired by the microscope at the first magnification; and
    controlling a relative position of the microscope with respect to the specimen such that the observation start position is contained in a field of view at the second magnification of the microscope.

20. A non-transitory recording medium storing a program, the program causing a computer of a microscope system provided with a microscope that acquires images at least at a first magnification and a second magnification higher than the first magnification to execute processes comprising:
    specifying a type of a container in which a specimen is placed;
    when starting observation of the specimen placed in the container at the second magnification, specifying an observation start position according to the type of the container by performing object detection according to the type of container on a first image that includes the container acquired by the microscope at the first magnification, and
    controlling a relative position of the microscope with respect to the specimen such that the observation start position is contained in a field of view at the second magnification of the microscope.

* * * * *